United States Patent
Wawrousek et al.

(10) Patent No.: US 9,867,424 B2
(45) Date of Patent: Jan. 16, 2018

(54) FOAMED PARTS HAVING A FABRIC COMPONENT, AND SYSTEMS AND METHODS FOR MANUFACTURING SAME

(71) Applicant: New Balance Athletic Shoe, Inc., Boston, MA (US)

(72) Inventors: Christopher J. Wawrousek, Somerville, MA (US); Sean B. Murphy, North Andover, MA (US); Matthew Dunbar, Littleton, MA (US); Patrick Y. Choe, Medford, MA (US)

(73) Assignee: New Balance Athletics, Inc., Boston, MA (US)

( * ) Notice: Subject to any disclaimer, the term of this patent is extended or adjusted under 35 U.S.C. 154(b) by 785 days.

(21) Appl. No.: 13/799,675

(22) Filed: Mar. 13, 2013

(65) Prior Publication Data

US 2013/0276333 A1    Oct. 24, 2013

Related U.S. Application Data

(60) Provisional application No. 61/610,206, filed on Mar. 13, 2012.

(51) Int. Cl.
*B29C 44/08* (2006.01)
*A43B 13/18* (2006.01)
(Continued)

(52) U.S. Cl.
CPC ............ *A43B 13/18* (2013.01); *A43B 1/0009* (2013.01); *A43B 13/127* (2013.01);
(Continued)

(58) Field of Classification Search
CPC ....... A43B 13/18; A43B 13/16; A43B 1/0009; A43B 13/127; A43B 13/141;
(Continued)

(56) References Cited

U.S. PATENT DOCUMENTS 3,050,427 A * 8/1962 Games ................. B29C 70/508
156/78
6,773,640 B2 * 8/2004 Sugihara ............. B29C 44/3446
264/328.7

(Continued)

FOREIGN PATENT DOCUMENTS

| CN | 1334283 A | 2/2002 |
| CN | 1894317 A | 1/2007 |

(Continued)

OTHER PUBLICATIONS

First Office Action in Chinese Patent Application No. 201380024990.6, with English translation dated Aug. 5, 2015, 20 pages.
International Preliminary Report for International Application No. PCT/US2013/030789 dated Sep. 25, 2014, 6 pages.
Preliminary Notice of Reasons for Rejection in Japanese Application No. 2015-500549 dated Feb. 2, 2017 (with translation).

*Primary Examiner* — Galen Hauth
(74) *Attorney, Agent, or Firm* — Goodwin Procter LLP

(57) ABSTRACT

The invention relates to parts having a foamed polymeric material attached to a fabric, and systems and methods for forming same. An example method of attaching foamed polymeric material to a fabric layer includes providing a mold having at least one cavity and at least one material injection channel in fluid communication with the cavity, disposing a fabric over the at least one cavity, closing the mold, injecting unfoamed polymeric material into the at least one cavity through the material injection channel, wherein the unfoamed polymeric material penetrates at least a portion of the fabric proximate the at least one cavity to attach the polymeric material to the fabric layer, and foaming the unfoamed polymeric material.

19 Claims, 21 Drawing Sheets

(51) Int. Cl.
*A43B 1/00* (2006.01)
*A43B 13/12* (2006.01)
*A43B 13/14* (2006.01)
*A43B 13/16* (2006.01)
*B29D 35/14* (2010.01)
*B29D 35/00* (2010.01)
*B29C 44/12* (2006.01)

(52) U.S. Cl.
CPC ............ *A43B 13/141* (2013.01); *A43B 13/16* (2013.01); *B29C 44/1209* (2013.01); *B29C 44/1271* (2013.01); *B29D 35/0018* (2013.01); *B29D 35/0063* (2013.01); *B29D 35/142* (2013.01); *B29D 35/148* (2013.01)

(58) Field of Classification Search
CPC ............ B29C 44/1209; B29C 44/1271; B29C 44/027; B29C 44/083; B29D 35/0063; B29D 35/0018; B29D 35/142; B29D 35/148
See application file for complete search history.

(56) References Cited

U.S. PATENT DOCUMENTS

| | | | | |
|---|---|---|---|---|
| 2002/0077014 | A1* | 6/2002 | Gabbrielli | B29C 43/021 442/327 |
| 2004/0261297 | A1* | 12/2004 | Park | B29D 35/0054 36/87 |
| 2005/0175726 | A1* | 8/2005 | Yang | B29C 44/083 425/170 |
| 2006/0083912 | A1 | 4/2006 | Park | |

FOREIGN PATENT DOCUMENTS

| | | |
|---|---|---|
| DE | 884017 C | 7/1953 |
| EP | 1166991 A2 | 1/2002 |
| JP | 4728063 B2 | 10/1972 |
| JP | 2002079545 A | 3/2002 |
| WO | WO-2001001807 A1 | 1/2001 |
| WO | WO-2011088461 A1 | 7/2011 |

* cited by examiner

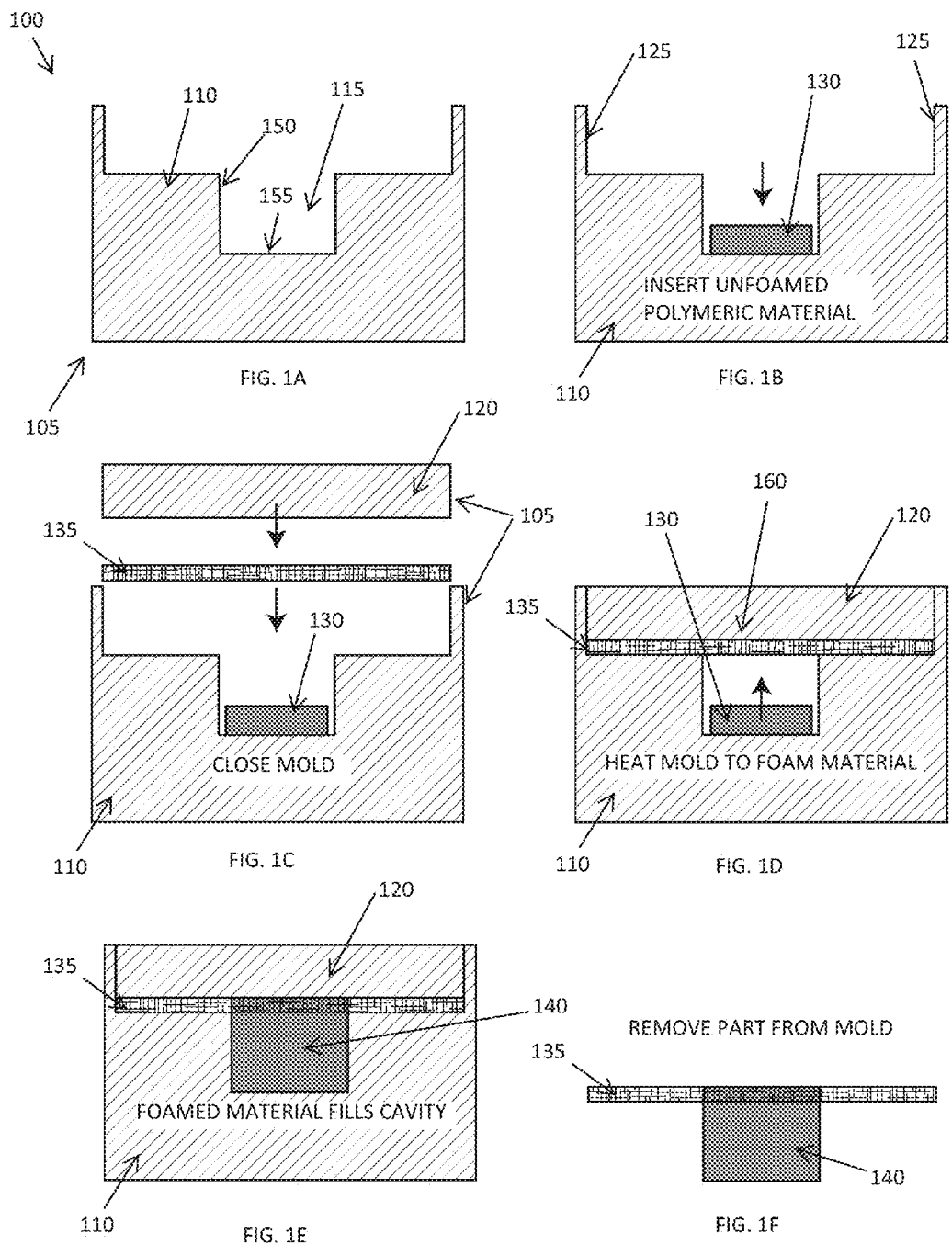

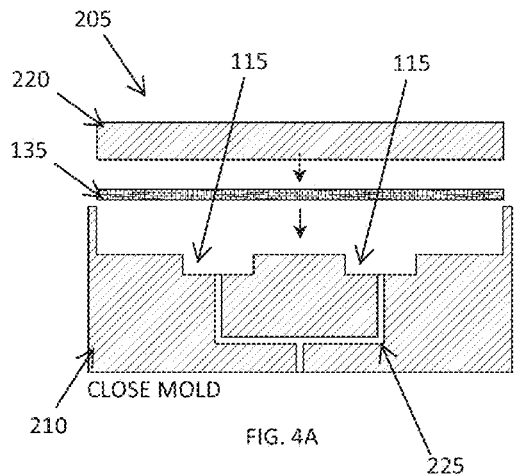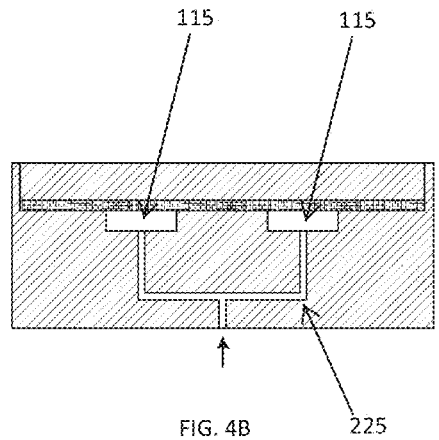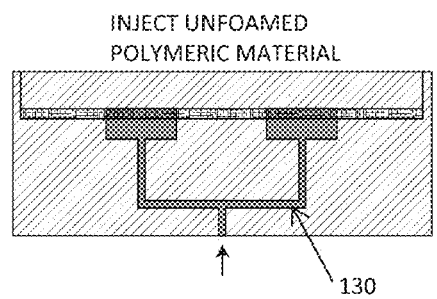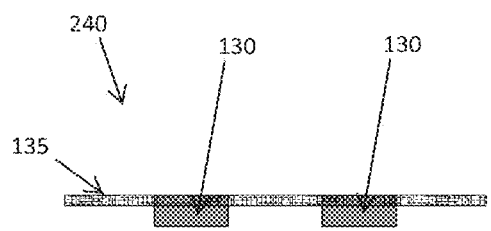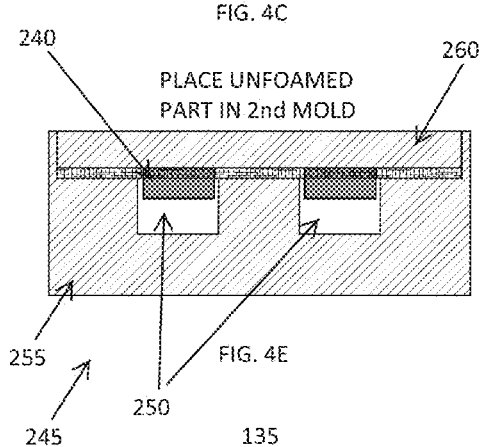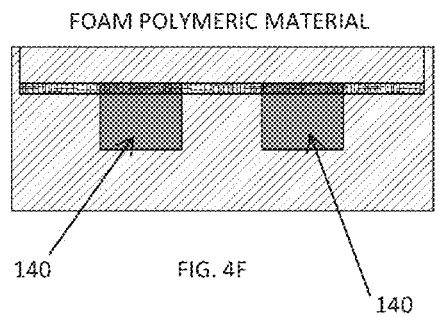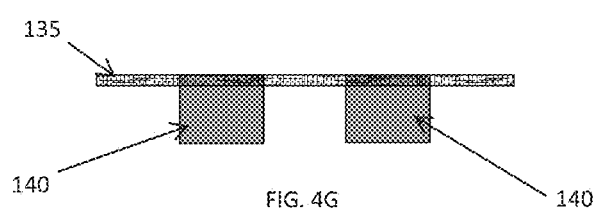

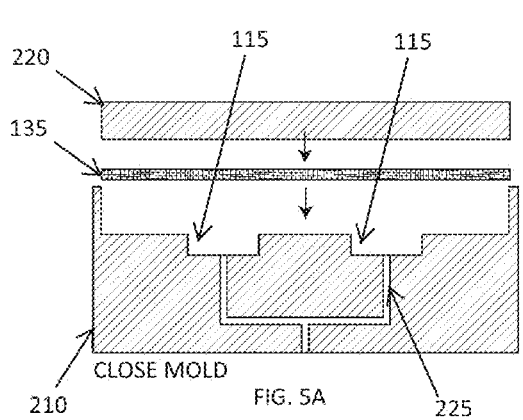
FIG. 5A CLOSE MOLD
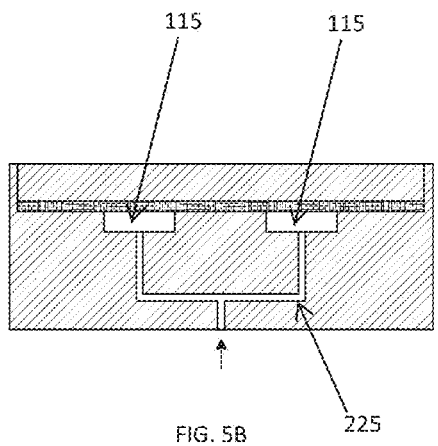
FIG. 5B
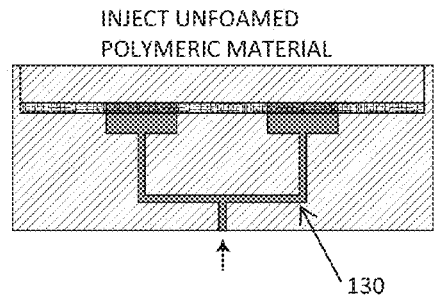
FIG. 5C INJECT UNFOAMED POLYMERIC MATERIAL
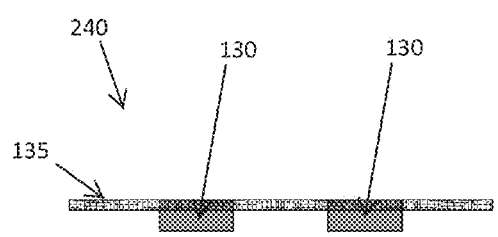
FIG. 5D
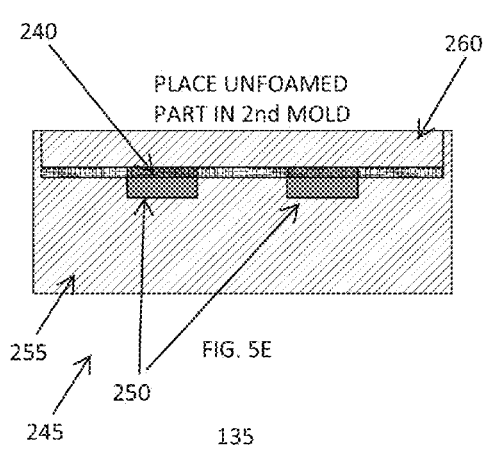
FIG. 5E PLACE UNFOAMED PART IN 2nd MOLD
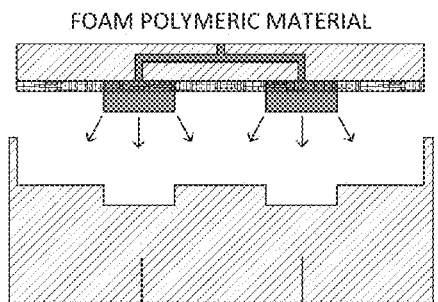
FIG. 5F FOAM POLYMERIC MATERIAL
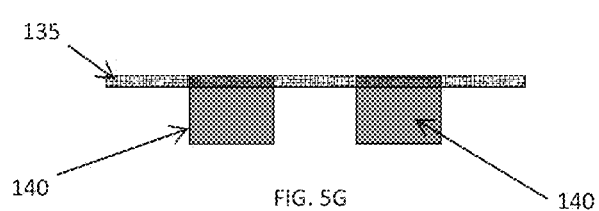
FIG. 5G

CLOSE MOLD
INJECT UNFOAMED POLYMERIC MATERIAL

PLACE UNFOAMED PART IN 2nd MOLD

FOAM POLYMERIC MATERIAL

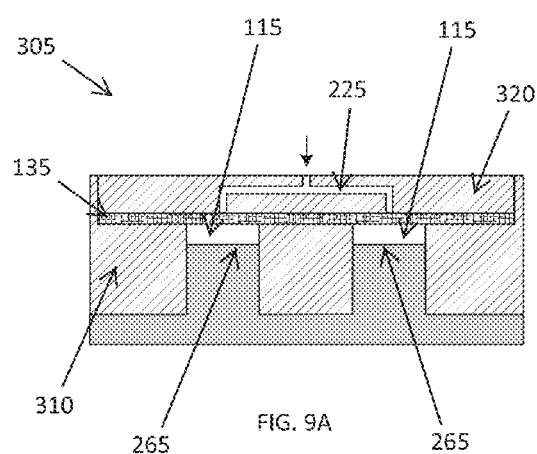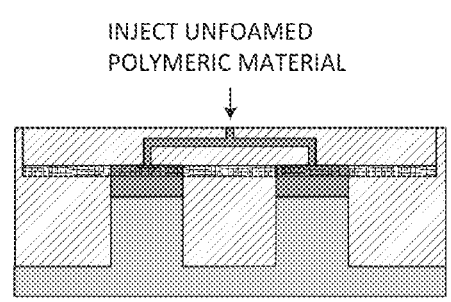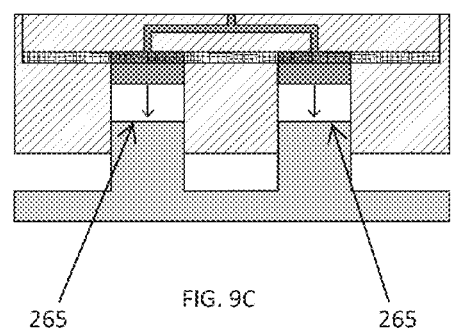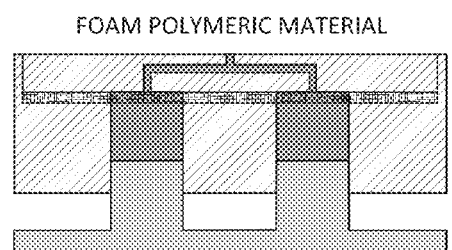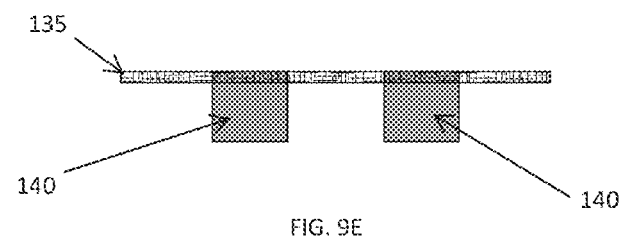

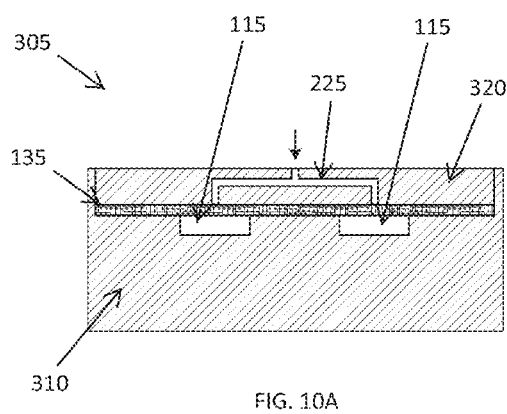
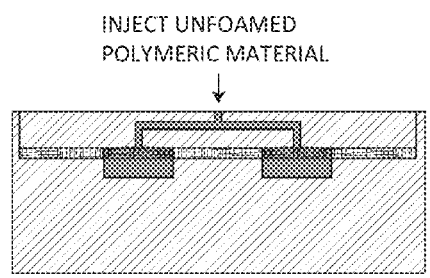
FIG. 10A   FIG. 10B
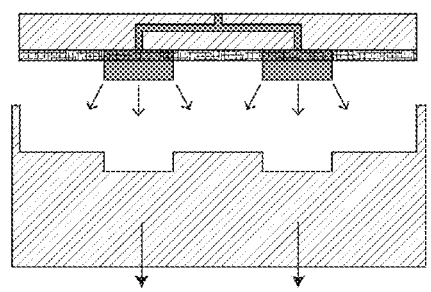
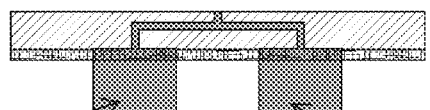
FIG. 10C   FIG. 10D
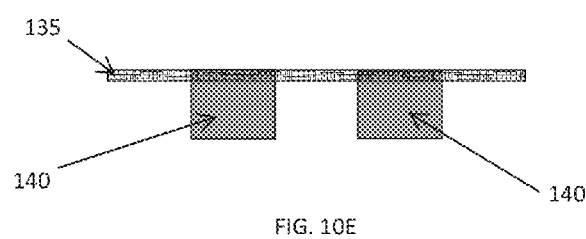
FIG. 10E

FOAMED PARTS HAVING A FABRIC COMPONENT, AND SYSTEMS AND METHODS FOR MANUFACTURING SAME

CROSS-REFERENCE TO RELATED APPLICATIONS

This application claims priority to and the benefit of U.S. Provisional Patent Application Ser. No. 61/610,206, filed Mar. 13, 2012, the disclosure of which is incorporated herein by reference in its entirety.

FIELD OF THE INVENTION

The present invention relates generally to the field of foamed parts, and more particularly to shoe soles, and components thereof, and systems and methods for manufacturing same.

BACKGROUND OF THE INVENTION

Traditional methods of manufacturing athletic footwear often require the molding of a sole of the shoe and thereafter gluing, stitching, or otherwise attaching the molded sole portion to a preformed upper. The sole may include elements such as an insole, a midsole, and a ground contacting outsole, with these elements formed together to create a unitary sole construction whose flexibility is limited by the flexibility of the materials used to construct the sole. While use of high flexibility and lightweight materials may go some way to reducing the weight of the shoe and increasing the flexibility of the shoe as felt by a wearer, traditional manufacturing methods limit the flexibility and weight that can be achieved while maintaining the required degree of structural durability and performance required of athletic footwear.

SUMMARY OF THE INVENTION

A need exists for improved methods of manufacturing shoe sole components to produce an article of footwear having a truly lightweight structure and high flexibility while still providing a high degree of performance, stability, and durability. As such, the present invention is directed towards parts having a foamed polymeric material attached to a fabric, and systems and methods for creating same, where the formed parts may, in one embodiment, form at least a portion of a sole of an article of footwear.

One aspect of the invention includes a method of attaching foamed polymeric material to at least one fabric layer. The method includes providing a mold comprising at least one cavity, inserting unfoamed polymeric material into the cavity to partially fill the cavity with unfoamed polymeric material, disposing at least one fabric layer over the cavity, and closing the mold. The method further includes foaming the unfoamed polymeric material within the cavity, wherein the foamed polymeric material penetrates at least a portion of the fabric layer proximate the cavity to attach the foamed polymeric material to the fabric layer.

In one embodiment the mold comprises a plurality of cavities, with the plurality of cavities, for example, being arranged such that the foamed polymeric material and fabric forms at least a portion of a sole of an article of footwear. The polymeric material may include a material selected from the group consisting of polymers, elastomers, and thermoplastics and, for example, may include, or consist essentially of, at least one of ethylene vinyl acetate (EVA), EVA copolymers, polyethylene (PE), chlorinated polyethylene (CPE), polyurethane (PU), thermoplastic polyurethane (TPU), DuPont™ Surlyn®, blown rubber, or thermoplastic rubbers (TPRs).

The unfoamed polymeric material may further include at least one blowing agent. In one embodiment, foaming the unfoamed polymeric material includes heating the cavity to a temperature at or above the temperature at which the blowing agent activates. Alternatively, foaming the unfoamed polymeric material may include any appropriate means such as, but not limited to, at least one of heating the cavity, changing a pressure within the cavity, and/or introducing at least one foaming agent into the cavity.

In one embodiment one or more solid pellet of unfoamed polymeric material is inserted into each of the at least one cavity to partially fill each of the at least one cavity with unfoamed polymeric material. Alternatively, the unfoamed polymeric material can be inserted into the at least one cavity as a plurality of solid pellets or as a liquid. Prior to foaming, the unfoamed polymeric material can fill the cavity to a volume of about 16-100% of the volume of the cavity. The at least one fabric layer can include, or consist essentially of, one or more non-woven fabric layer, woven fabric layer, and/or knitted fabric layer.

Another aspect of the invention includes a method of attaching foamed polymeric material to at least one fabric layer including the steps of providing a first mold comprising at least one first cavity and at least one material injection channel in fluid communication with the at least one first cavity, disposing at least one fabric layer over the at least one first cavity, and closing the first mold. The method further includes injecting unfoamed polymeric material into the at least one first cavity through the at least one material injection channel, wherein the unfoamed polymeric material penetrates at least a portion of the fabric layer proximate the at least one first cavity to attach the polymeric material to the fabric layer, and foaming the unfoamed polymeric material.

In one embodiment the mold includes a plurality of cavities, with the plurality of cavities, for example, being arranged such that the foamed polymeric material and fabric forms at least a portion of a sole of an article of footwear. The polymeric material may include a material selected from the group consisting of polymers, elastomers, and thermoplastics and may include, or consist essentially of, at least one of ethylene vinyl acetate (EVA), EVA copolymers, polyethylene (PE), chlorinated polyethylene (CPE), polyurethane (PU), thermoplastic polyurethane (TPU), DuPont™ Surlyn®, blown rubber, or thermoplastic rubbers (TPRs). The at least one fabric layer may include, or consist essentially of, at least one of a non-woven fabric layer, woven fabric layer, or a knitted fabric layer.

In one embodiment foaming the unfoamed polymeric material includes removing the fabric and attached unfoamed polymeric material from the first mold, providing a second mold comprising at least one second cavity, the at least one second cavity comprising a volume greater than that of the at least one first cavity, placing the fabric layer and attached unfoamed material into second mold such that the unfoamed polymeric material extends into the at least one second cavity, closing the second mold, and foaming the unfoamed polymeric material within the second cavity. The at least one second cavity may have a volume of between about 1.1 to 6 times the volume of the at least one first cavity, or about 1.1 to 3 or 4, or about 1.2 to 2, or about 1.2 to 1.5 times the volume of the at least one first cavity. The unfoamed polymeric material may include at least one blowing agent. Foaming the unfoamed polymeric material within the second cavity may include heating the at least one second cavity to a temperature at or above the temperature at which the blowing agent activates. In addition, the unfoamed polymeric material may be injected into the at least one first cavity at a temperature below the temperature at which the blowing agent activates.

In one embodiment foaming the unfoamed polymeric material includes expanding the at least one first cavity after injecting the unfoamed polymeric material and foaming the unfoamed polymeric material within the at least one expanded first cavity. The at least one first cavity may, for example, be expanded to a volume of about 1.1 to 6 times its unexpanded volume, or about 1.1 to 3 or 4, or about 1.2 to 2, or about 1.2 to 1.5 times its unexpanded volume. The unfoamed polymeric material may include at least one blowing agent. Foaming the unfoamed polymeric material within the expanded first cavity may include heating the at least one expanded first cavity to a temperature at or above the temperature at which the blowing agent activates while unfoamed polymeric material may be injected into the at least one first cavity at a temperature below the temperature at which the blowing agent activates.

In one embodiment the unfoamed polymeric material is injected into the at least one first cavity under pressure, and foaming the unfoamed polymeric material comprises opening the first mold to release at least a portion of the pressure within the at least one first cavity. Releasing the pressure may include, or consist essentially of, separating a first mold portion containing the cavity from a second mold portion such that the polymeric material is free to foam and expand without restricting by one or more wall of the cavity, or opening the cavity to the surrounding atmosphere while retracting at least one wall of the cavity to provide controlled expansion of the foaming polymeric material.

In one embodiment foaming the unfoamed polymeric material includes providing a mold comprising at least one cavity having at least one retractable wall and expanding the at least one cavity to foam the unfoamed polymeric material by retracting the at least one retractable wall, wherein the unfoamed polymeric material includes at least one blowing agent adapted to come out of solution upon retracting the at least one retractable wall. In this embodiment the blowing agent may, for example, be introduced into the polymeric material as a supercritical fluid within a temperature and pressure controlled mixing device upstream of the at least one material injection channel.

Another aspect of the invention includes a method of attaching foamed polymeric material to at least one fabric layer. The method includes providing a mold including a plurality of elongate cavities connected by at least one base cavity, and at least one material injection channel in fluid communication with the at least one base cavity and/or at least one of the elongate cavities. The method further includes injecting unfoamed polymeric material through the at least one material injection channel to fill the at least one base cavity and the plurality of elongate cavities, foaming the unfoamed polymeric material, thereby forming a foamed polymeric component comprising a plurality of elongate extensions extending from at least one base portion, removing the foamed polymeric component from the mold, disposing adhesive on a distal end of the elongate extensions, adhering the distal end of the elongate extensions to at least one fabric layer, and removing the base portion from the elongate extensions, thereby leaving the elongate extensions bonded to the at least one fabric layer.

In one embodiment the plurality of cavities are arranged such that the elongate extensions and fabric forms at least a portion of a sole of an article of footwear. The unfoamed polymeric material may include at least one blowing agent, and foaming the unfoamed polymeric material can include at least one of heating the unfoamed polymeric material and/or changing a pressure being applied to the unfoamed polymeric material.

Another aspect of the invention includes an article of footwear including an upper and a sole, wherein the sole includes a plurality of separate elongate elements of foamed polymeric material penetrating, or otherwise attached to, a fabric layer.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIGS. 1A to 1F are schematic views of a method of molding a polymeric material to a fabric, in accordance with one embodiment of the invention;

FIGS. 4A to 4G are schematic views of another method of molding a plurality of polymeric material elements to a fabric, in accordance with one embodiment of the invention;

FIGS. 5A to 5G are schematic views of another method of molding a plurality of polymeric material elements to a fabric, in accordance with one embodiment of the invention;

FIGS. 9A to 9E are schematic views of another method of molding a plurality of polymeric material elements to a fabric, in accordance with one embodiment of the invention;

FIGS. 10A to 10E are schematic views of another method of molding a plurality of polymeric material elements to a fabric, in accordance with one embodiment of the invention;

DETAILED DESCRIPTION

Figure 2A:
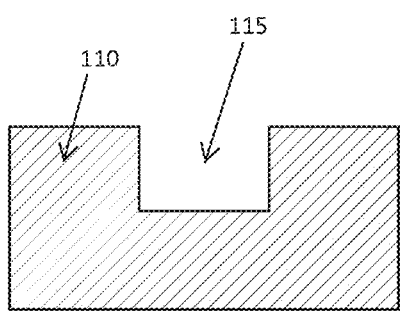
FIGS. 2A to 2F are schematic views of another method of molding a polymeric material to a fabric, in accordance with one embodiment of the invention.
Figure 2B:
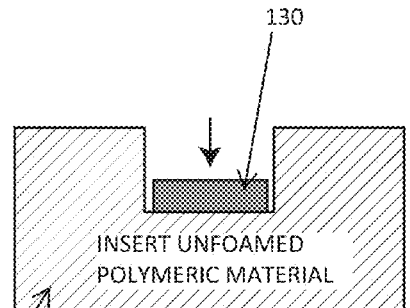
Figure 2C:
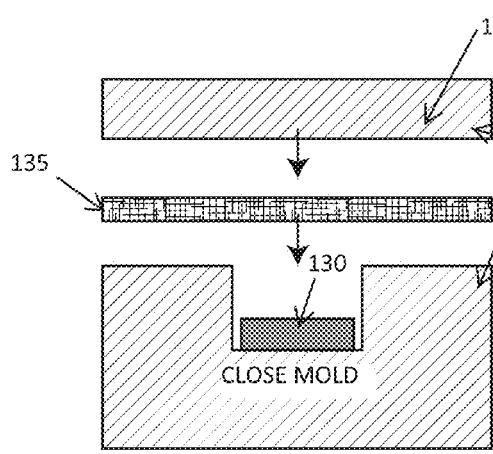
Figure 2D:
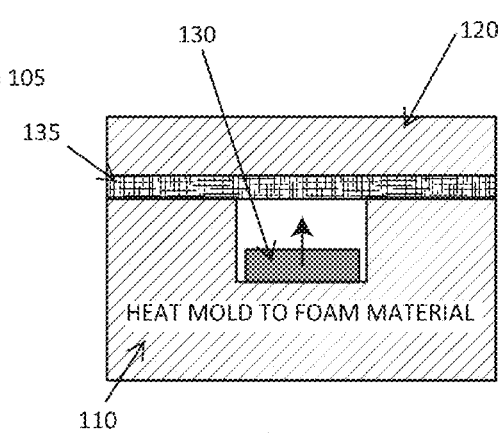
Figure 2E:
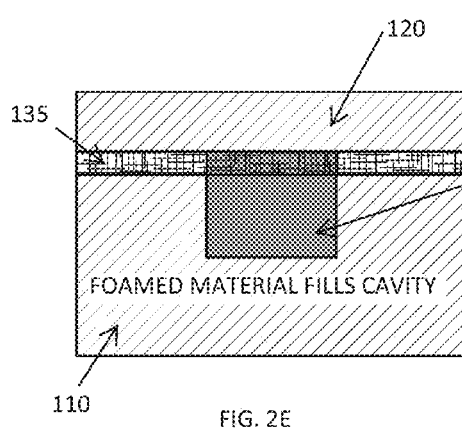
Figure 2F:
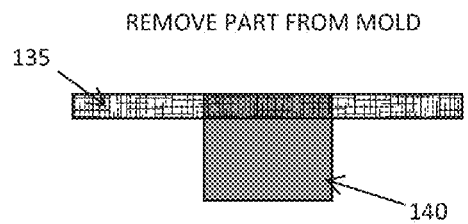
Figure 3A:
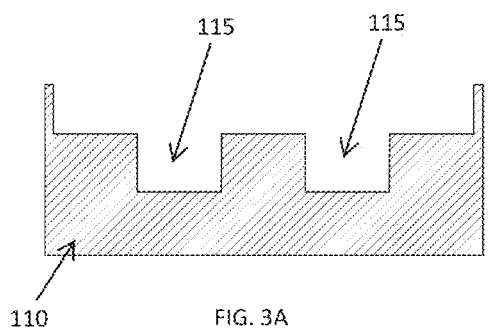
FIGS. 3A to 3F are schematic views of another method of molding a plurality of polymeric material elements to a fabric, in accordance with one embodiment of the invention.
Figure 3B:
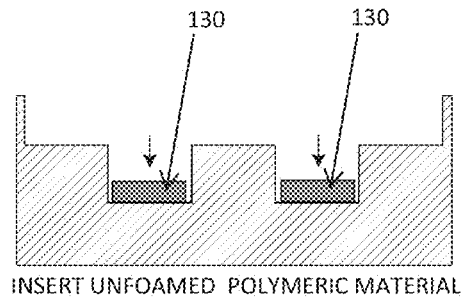
Figure 3C:
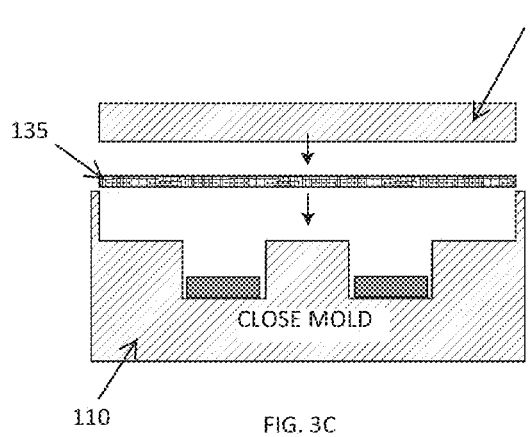
Figure 3D:
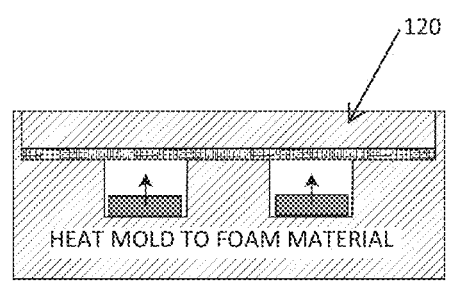
Figure 3E:
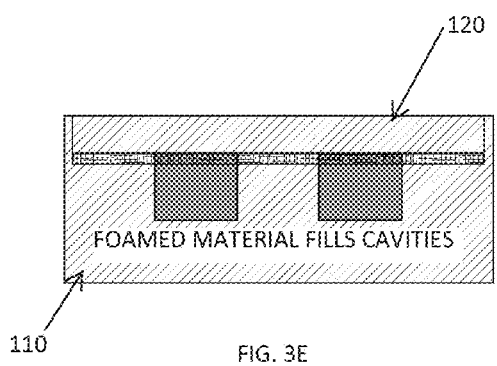
Figure 3F:
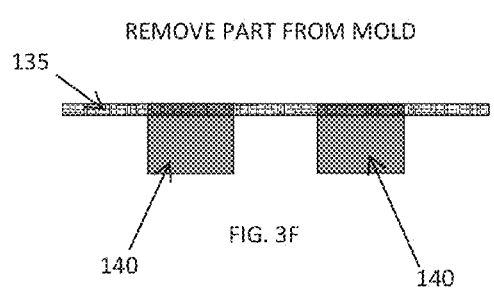

The invention described herein relates to systems and methods for attaching polymeric foamed articles to at least one base layer of fabric for use, for example, in footwear, and the resulting components formed thereby. The systems and methods described herein may be used to produce components such as, but not limited to, soles, or components therefor, for footwear. In one example embodiment, the systems and methods described herein can be used to produce a shoe sole component comprising a plurality of discrete polymeric foamed elements that are attached to a base fabric layer, with the fabric layer being attached to a shoe upper to produce a shoe, or forming the upper, or a portion of the upper, of the shoe itself.

In various embodiments the methods and systems described herein can be used to produce parts having polymeric material attached to fabric for use in any number of products. For example, such parts may form the sole, or a portion of a sole, of an article of footwear and/or form at least a portion of an upper of an article of footwear. Fabric with polymeric material attached thereto can also be used to form garments for an upper and/or lower body of a wearer, with the polymeric material being useful, for example, in providing protective coverings and padding that is integrally attached to the garment. For example, in some embodiments of the invention molds can be arranged to manufacture foam and fabric parts for a number of purposes, such as providing foamed protective elements for garments or sporting accessories. Fabric with polymeric material attached thereto can also be used in products such as, but not limited to, protective sports accessories (e.g., elbow pads, shin pads, head protectors, etc), suitcases and other carrying bags, or the like.

The polymeric material may include, or consist essentially of, polymers, elastomers, and/or thermoplastics. For example, the polymeric material may be ethylene vinyl acetate (EVA), EVA copolymers, polyethylene (PE), chlorinated polyethylene (CPE), polyurethane (PU), thermoplastic polyurethane (TPU), DuPont™ Surlyn®, blown rubber, or thermoplastic rubber (TPR). In one example embodiment the polymeric material is a ground-contact EVA (i.e., an EVA formulated specifically to provide appropriate performance, wear, and durability characteristics to allow it to be used as the ground-contacting surface of a shoe sole.

A blowing agent is typically introduced into unfoamed polymeric material prior to foaming so as to provide a means of foaming the polymeric material. The blowing agent may be introduced into the polymeric material mixture with any desired blowing agent level. The desired blowing agent level depends upon the particular process and is generally less than about 1.5% by weight of polymeric material and blowing agent, although higher levels of blowing agent may be used in certain embodiments. In many embodiments, the blowing agent level is less than about 3% and, in some embodiments, less than about 1%. In one example embodiment, the blowing agent level is between 0.1% and 2%, or between 0.3% and 0.9%, or more particularly between 0.4% and 0.75%. In an alternative embodiment, the blowing agent level may be less than about 0.1%, or even lower, by weight of polymeric material and blowing agent mixture.

The blowing agent may include, or consist essentially of, any appropriate type of chemical or physical blowing agent known to those of ordinary skill in the art such as, but not limited to, nitrogen, carbon dioxide, hydrocarbons (e.g., propane), chlorofluorocarbons, noble gases and/or mixtures thereof. Example blowing agents are described in U.S. Patent Publication No. 2012/0329892, the disclosure of which is incorporated herein by reference in its entirety. In one example embodiment, the blowing agent includes, or consists essentially of, nitrogen. The blowing agent may be supplied in any flowable physical state such as a gas, a liquid, or a supercritical fluid (SCF). Alternatively, the blowing agent may be supplied in the form of a pelletized solid. According to one embodiment, a blowing agent source provides a blowing agent (e.g., nitrogen) that is in a supercritical fluid state upon injection into the extruder. In one embodiment a chemical blowing agent (e.g., azodicarbonamide or modified-azodicarbonamide) in liquid form can be mixed with the polymeric material and therafter activated by heating to a temperature at or above its activation temperature.

The blowing agent is dissolved, or otherwise mixed, into the unfoamed polymeric material such that it remains in a stable condition until a specific condition is met, at which time it activates, comes out of solution, decomposes, gasifies, or otherwise initiates foaming to nucleate a plurality of microcell sites and thereby foam the unfoamed polymeric material. The blowing agent may be selected to activate/come out of solution and foam the unfoamed polymeric material when a set temperature is reached and/or when a set pressure is reached. For example, in one embodiment the blowing agent activates at a temperature of between about 100° C. and about 160° C., and more particularly between about 100° C. and 120° C. and, for example, at about 110°

C. In alternative embodiments the blowing agent may be selected such that it activates/comes out of solution at a higher or lower temperature.

In one embodiment the unfoamed polymeric material with the blowing agent dissolved therein can be held at an elevated pressure, with the blowing agent activating when the pressure under which the unfoamed polymeric material is held is dropped (e.g., by expanding or opening a mold cavity in which the unfoamed polymeric material is held). For example, the unfoamed polymeric material with the blowing agent mixed therein (e.g., a supercritical fluid blowing agent) can be held at an elevated temperature and pressure within an upstream mixing and injection system and in one or more injection channels connecting the mixing and injection system with the mold cavity (or cavities), with foaming automatically initiating as or shortly after the material exits the injection channel(s) and enters the mold cavity (or cavities).

Fabrics for use in the invention may include, or consist essentially of, any appropriate knitted, woven, non-woven or otherwise constructed single or multi-layer fabric. The fabric may be formed from natural and/or man-made materials including, but not limited to, cotton, wool, silk, rayon, polyester, and/or nylon. In various embodiments the fabric may be a tricot fabric, a three-dimensional mesh fabric, or a plurality of separate layers of fabric that are stitched, bonded, welded, or otherwise attached. In one embodiment the fabric may include, or consist essentially of, a molded, rolled, or otherwise formed sheet of material that is perforated to provide openings into which expanding polymeric material can interdigitate during foaming.

An example system and method for attaching a foamed polymeric material to at least one layer of fabric is shown in FIGS. 1A to 1F. The system 100 includes a mold 105 including a first mold portion 110 having a cavity 115 therein. The mold 105 also includes a second mold portion 120 that can cover the cavity 115 to seal (or partially seal) the cavity 115 from the surrounding atmosphere. The second mold portion 120 can be detachable from the first mold portion 110 or be pivotably, or otherwise movably, attached to the first mold portion 110. In one embodiment the first mold portion 110 can include one or more raised walls 125 to receive the second mold portion 120 and to ensure a complete or incomplete (e.g., ventilated) seal of the cavity 115 when the second mold portion 120 is positioned and held in place. The second mold portion 120 may be clamped, screwed, or otherwise detachably held to the first mold portion 110 through any appropriate mechanical, pneumatic, hydraulic, and/or electromagnetic clamping system to ensure that an appropriate seal within the cavity 115 is maintained during the molding process. In an alternative embodiment the mold may have additional and/or differently shaped mold portions that can mate together in any appropriate manner and/or be oriented in any appropriate manner.

In an alternative embodiment the second mold portion 120 can include one or more raised wall 125, in addition to, or instead of the first mold portion 110, and/or additional separate mold components can be used to complete the seal of the cavity 115. In a further alternative embodiment no raised walls 125 are required, with the second mold portion 120 being held in place against the first mold portion 110 with sufficient force to ensure a sufficient cavity 115 seal without the need for any raised walls 125, as shown in FIGS. 2A-2F.

In one embodiment the mold cavity 115, when closed and/or sealed, is completely, or substantially completely, sealed from the surrounding atmosphere. In an alternative embodiment the mold cavity 115, when closed and/or sealed, is vented to the surrounding atmosphere through at least a portion of the fabric 135, through one or more spacer element placed within the mold 105, and/or through at least one separate venting passageway embedded within at least one of the first mold portion 110 and the second mold portion 120.

The cavity 115 is adapted to receive a volume of unfoamed polymeric material 130 (e.g., a volume of unfoamed EVA), as shown in FIG. 1B. The unfoamed polymeric material 130 may be inserted into the cavity 115 in solid or liquid form. For example, the unfoamed polymeric material 130 may be a single pellet of material that is die-cut from a calendar sheet of material or a pellet of material injection molded to a required shape in a separate mold. Alternatively, the unfoamed polymeric material 130 may be inserted into the cavity 115 as a plurality of small pellets of material. The unfoamed polymeric material 130 may be inserted into the cavity 115 by hand, or be held in a hopper and manually or automatically released from the hopper into the cavity 115 prior to foaming.

The pellet of unfoamed polymeric material 130 may have a similar cross-sectional shape to that of the cavity 115 or have a different cross-sectional shape, and may extend the full width of the cavity 115 or have a width less than that of the cavity 115. Having a width substantially the same as that of the cavity 115 results in the unfoamed polymeric material 130 expanding in only one direction (i.e., along the elongate length of the cavity 115) when foamed. Having a width less than that of the cavity results in the unfoamed polymeric material 130 expanding in three-dimensions when foamed, while also potentially allowing venting to occur along one or more side of the cavity between the polymeric material and the cavity wall.

To provide sufficient room for the unfoamed polymeric material 130 to expand during foaming, the volume of unfoamed polymeric material 130 inserted into the cavity 115 is less that the volume of the cavity 115 itself. For example, the volume of unfoamed polymeric material 130 may be from about 16%, or about 25%, or about 33%, or about 50%, or about 67%, or about 83%, or about 91% (or even greater) of the volume of the cavity 115, and for example between about 40 to 100% of the volume of the cavity 115, or between about 50 to 80% of the volume of the cavity 115, or between about 60 to 80% of the volume of the cavity 115 and, for example, about 80% of the volume of the cavity 130, or more. Controlling the volume of the cavity 115 that is filled by the unfoamed polymeric material 130 allows for the controlling of the density of the material after foaming, with a smaller amount of unfoamed polymeric material 130 within the cavity 115 producing a foamed element having a lower density. In an alternative embodiment the volume of unfoamed polymeric material 130 may be less than about 40% of the volume of the cavity 115. In one embodiment the unfoamed polymeric material 130 fills the entire, or substantially the entire, cavity 115 prior to foaming, with expansion of the material during foaming being limited to expansion into the fabric 135.

Once the unfoamed polymeric material 130 is inserted into the cavity 115 a fabric 135 is placed over the cavity 115 and the second mold portion 120 is secured over the cavity 115 and the fabric 135 to seal the cavity 115 with a portion of the fabric 135 exposed to the cavity 115, as shown in FIGS. 1C and 1D. The fabric 135 may be of any appropriate size, shape, and material, with any appropriate percentage of the fabric 135 being exposed to the cavity 115 depending upon the size of the cavity 115 and the amount of fabric required for the particular part. In one embodiment the fabric 135 may be a standardized shape and size (e.g., a square or rectangular shape adapted to fit within a standard shaped or sized mold 105), with the fabric cut after foaming and attachment of the polymeric material to form the finished part. Alternatively, the fabric can be cut to its finished size and/or shape (e.g., a shoe sole shape) prior to placing into the mold 105. In one embodiment the mold 105 can include one or more cutting elements or edges to cut the fabric within the mold 105 prior to or after foaming of the polymeric material 130.

Once the fabric 135 has been positioned above the cavity 115 and the mold 105 has been closed, the mold 105 can be used to foam the unfoamed polymeric material 130. This may be achieved, for example, by heating the mold to a temperature at or above which the blowing agent suspended within the unfoamed polymeric material 130 activates and initiates the foaming process. The mold may be heated and/or cooled through any appropriate temperature regulation method such as, but not limited to, placing the mold in an oven (e.g., a press oven) and/or passing heated and/or cooled fluid or gas through one or more heating channels within or next to the mold 105. Alternatively, the unfoamed polymeric material may be foamed by injecting a separate blowing agent into the cavity 115 to react with the unfoamed polymeric material 130 or a foaming agent embedded therein.

In one embodiment a wall of one or more of the first mold portion 110 and/or the second mold portion 120 can include one or more raised gasket elements to press against the fabric to maintain a seal around the cavity 115 and prevent bleeding of the unfoamed polymeric material 130 into the surrounding fabric beyond the cavity 115. In an alternative embodiment a separate gasket element (e.g., a gasket element formed from high heat resistant EVA, rubber, silicone, or another appropriate material) can be used instead of, or in addition to, a gasket element on the first mold portion 110 and/or the second mold portion 120.

In one embodiment a gasket element can be used to provide a partial seal while also providing a spacing function to allow venting of the cavity 115 (i.e., escape of gases from the cavity 115) during injection of the unfoamed polymeric material 130 and/or during foaming. In another embodiment a spacer element for providing venting may take the form or a mesh (e.g., a rubber, fabric or metal mesh) placed between the fabric 135 and the second mold portion 120.

Foaming the unfoamed polymeric material 130 results in the material expanding to fill the cavity 115 and interdigitate with the fabric 135 proximate the cavity. This results in the material forming a foamed elongate element 140 that is fixedly attached to the fabric 135 to form the foamed material and fabric part. The foaming material interdigitates with the fabric 135 by expanding into gaps between fibers of the fabric 135, and/or perforations or other openings within the fabric 135, during foaming, and thereafter fixedly setting in the fabric 135 as the foamed material cools and sets.

In one embodiment the mold 105 includes a plurality of separate cavities 115 above which a fabric 135 is placed. An example method of manufacturing a part using a mold 105 having a plurality of cavities 115 is shown in FIGS. 3A to 3F. In this embodiment the cavities 115 can be or any appropriate shape and be arranged in any appropriate pattern such that, upon foaming of the unfoamed polymeric material 130 within each cavity 115, a finished part including a plurality of separate foamed elongate elements 140 extending from a sheet of fabric 135 is produced. The cavities 115 may all be of the same cross-sectional shape and size, and/or same depth, or be of differing volumes and shapes, depending upon the particular part being manufactured, and the particular density of material required for each elongate element 140.

In various embodiments the cavity 115, or cavities, may be of any appropriate volume and may have any appropriate cross-sectional shape. For example, the cavity 115, or cavities, may produce foamed elements having a substantially circular, oval, triangular, square, rectangular, or polygonal (e.g., pentagon, hexagon, heptagon, octagon, or higher order polygon) cross-section, or form foamed elements having more complex cross-sectional shapes (e.g., forming complex straight-lined and/or curved cross-sections, forming letters and/or numbers, or forming any other appropriate shape).

In one embodiment the side walls 150 of the cavity 115, or cavities, may be linear and may extend at right angles to the proximal wall 160 (i.e., the wall against which the fabric 135 is placed) or at an acute angle to the proximal wall 160 (either broadening or narrowing the cavity 115 as it extends away from the proximal wall 160). Alternatively the side walls 150 of the cavity 115 can be curved in any appropriate manner or include both curved and a linear side wall portions. The distal wall 155 of the cavity 115, or cavities, may be planar and extend parallel to or at an angle to the proximal wall 160 or may, alternatively, be curved in any appropriate manner. Similarly, the proximal wall 160 of the cavity 115, or cavities, may be planar and extend parallel to or at an angle to the distal wall 155 or may, alternatively, be curved in any appropriate manner.

The side walls 150, proximal wall 160, and/or distal wall 155 of the cavity 115, or cavities, may have a pattern, graphic, or other appropriate texture and/or roughness incorporated therein. For example, in an embodiment wherein a fabric and a plurality of foamed extensions of polymeric material are used to provide a sole, or a portion of a sole, of an article of footwear, the distal walls 155 of the cavities 115 in which the polymeric material is foamed may be textured to provide a textured distal surface on the elongate elements 140, thereby providing a roughened ground-contact surface for the resulting shoe.

In one embodiment the distal walls 155 of the cavities 115 in which the polymeric material is foamed may include a protrusion, thereby producing a elongate elements 140 having a cavity (having an inverse shape to the protrusion) that can be used to provide gripping functionality to the sole and/or receive rubber outsole elements or other appropriate fixtures.

Figure 8A:
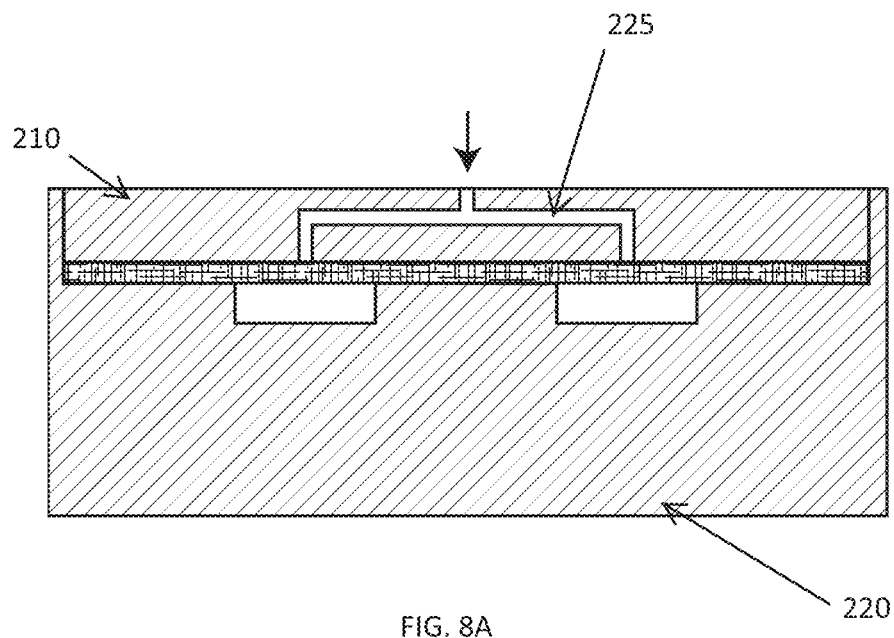
FIG. 8A is a schematic view of a mold for molding a plurality of polymeric material elements to a fabric, in accordance with one embodiment of the invention.
Figure 8B:
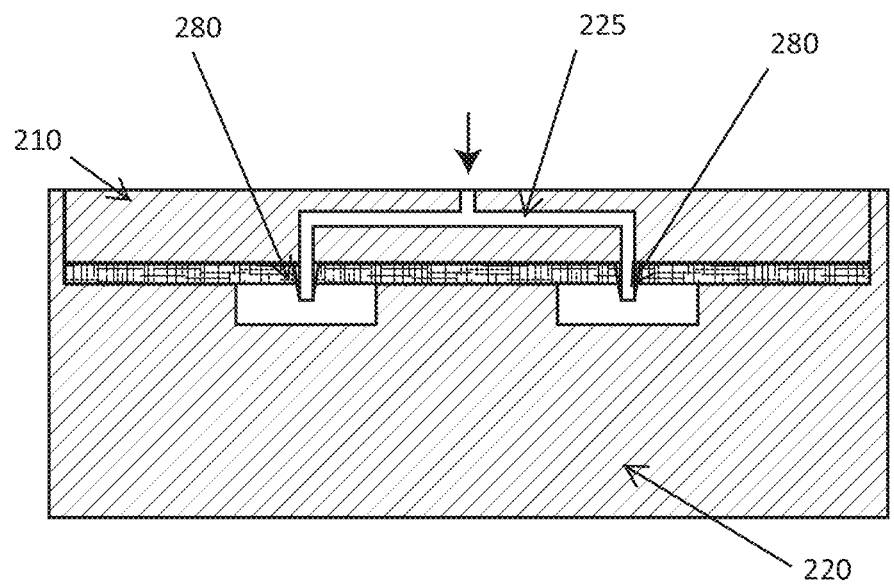
FIG. 8B is a schematic view of another mold for molding a plurality of polymeric material elements to a fabric, in accordance with one embodiment of the invention.

One embodiment of the invention includes injection molding unfoamed polymeric material onto a fabric and thereafter foaming the polymeric material to form the finished part. An example method of forming such a part is shown in FIGS. 4A to 4G. In this embodiment, a first mold 205 having a first mold portion 210, a plurality of cavities 115, and a second mold portion 220 is provided with one or more material injection channels 225 in fluid communication with the plurality of cavities 115. The fluid injection channels may be embedded within the first mold portion 210, as shown in FIGS. 4A to 4C, or in the second mold portion 220, as shown in FIGS. 8A and 8B. Alternatively, the fluid injection channel(s) 225 can be positioned between the first mold portion 210 and the second mold portion 220, or positioned in any other appropriate mold portion.

Again, a fabric 135 can be positioned within the mold 205 such that portions of the fabric 135 are exposed to the cavities 115 when the mold is closed, as shown in FIG. 4B. Upon closing the mold, unfoamed polymeric material 130 can be injected into each of the cavities 115 through material injection channels 225 to fill the cavities 115 and penetrate/interdigitate with, and thereby attach to, the fabric 135.

In one embodiment the unfoamed polymeric material 130 can include one or more blowing agents to allow the material to foam upon activation of the blowing agent. In order to prevent premature foaming of the unfoamed polymeric material 130, the unfoamed polymeric material 130 can be injected into the cavities 115 at a temperature above the melt temperature of the material but below the activation temperature of the blowing agent. In one embodiment the material can be injected into the cavities 115, and held in the at a pressure sufficient to prevent activation of the blowing agent in addition to, or instead of, holding the temperature of the material below the activation temperature of the blowing agent.

Once the unfoamed polymeric material 130 has been injected into the cavities 115 the material in the mold 205 can be cooled to set the unfoamed polymeric material 130 while attached to the fabric 135, after which the unfoamed fabric/polymeric material part 240 can be removed from the first mold 205, as shown in FIG. 4D. In various embodiments the molds described herein can include any appropriate heating and/or cooling systems (such as, but not limited to, heating and cooling channels for passing heated and/or cooled fluids or liquids therethrough). Cooling may be carried out within the first mold 205 or be carried out outside of the first mold 205 (e.g., air cooling outside of any mold or cooling in a controlled temperature oven).

In one embodiment the unfoamed fabric/polymeric material part 240 is then placed into a second mold 245 that has cavities 250 arranged in the same configuration as the cavities 115 in the first mold 205, but having a larger volume than the cavities 115 in the first mold 205. The cavities 250 in the second mold 245 may have the same or a different shape to the corresponding cavity 115 in the first mold 205. The second mold 245 can also include a first mold portion 255 in which the cavities 250 are located, and a second mold portion 260 for closing over the cavities 250. Providing cavities 250 having a larger volume than that of the first mold cavities 115 (and therefore a larger volume than that of the unfoamed elongate extensions on the unfoamed fabric/polymeric material part 240) provides a defined volume into which the unfoamed polymeric material 130 can expand upon activation of the blowing agent within the unfoamed polymeric material 130.

Foaming of the unfoamed polymeric material 130 can, in one embodiment, be achieved by heating the cavities 250 to a temperature at or above the activation temperature of the blowing agent. Once such a temperature is achieved the blowing agent will activate, thereby foaming the unfoamed polymeric material 130 and expanding the material to fill the volume of the second cavities 250. Once foaming has occurred, as shown in FIG. 4F, the second mold 245 can be cooled and the finished part, having a plurality of separate foamed elongate elements 140 extending from a sheet of fabric 135, can be removed from the second mold 245, as shown in FIG. 4G. Cooling may be carried out within the second mold 245 or be carried out outside of the second mold 245 (e.g., air cooling outside of any mold or cooling in a controlled temperature oven).

The volume of the second mold cavities 250 may be of any appropriate size and/or shape to ensure the required level of expansion of the material to produce a part having the required dimensions, density, and other structural parameters. For example, in various embodiments the volume of the second mold cavities 250 may be from about 100% to 600% of the volume of the first mold cavities 115, or from about 110% to 300% or 400% of the volume of the first mold cavities 115, or about 110% to 150% of the volume of the first mold cavities 115, or about 120% to 200% of the volume of the first mold cavities 115, or about 120% to 150% of the volume of the first mold cavities 115.

In one embodiment, as shown in FIGS. 5A to 5G, the second mold 245 may have cavities 250 that have the same shape and volume, or substantially the same shape and volume, as the volume of the first mold cavities 115 (and therefore the same shape and volume as the unfoamed elongate extensions on the unfoamed fabric/polymeric material part 240). In this embodiment, heating the cavities 250 within the second mold 245 to a temperature at or above the activation temperature of the blowing agent within the material will not foam the material within the mold due to there being no room for the unfoamed polymeric material 130 to expand into. In this embodiment foaming and expansion of the polymeric material occurs when the first mold portion 255 and second mold portion 260 are separated, as shown in FIG. 5F, thereby releasing the pressure within the cavities 250 and providing room into which the foaming polymeric material can expand. In this embodiment the expansion of the polymeric material during foaming is not restricted be the walls of the cavities 250 within the first mold portion 255, thereby allowing for expansion of the material in three-dimensions to produce the finished part having a plurality of separate foamed elongate elements 140 extending from a sheet of fabric 135.

In one embodiment one or more pressure release channels can be positioned in fluid communication with the mold cavities 250 such that depressurizing of the cavities 250 (to initiate foaming of the unfoamed polymeric material portions 130) can be achieved by opening the pressure release channels, for example by opening a valve system or moving an element within the cavity 250 (e.g., a movable distal wall) to expose an opening of the pressure release channels, thereby exposing the pressurized cavity 250 to a surrounding atmospheric condition.

In various embodiments the cavities 115 used to form the unfoamed polymeric material 130 can be configured to produce parts having any appropriate shape. In one embodiment, as shown in FIGS. 6A through 6G, the cavities 115 include a sloped side wall section 117 and a vertical side wall section 119, thereby forming unfoamed polymeric material portions 130 having a sloped portion 132 and a vertical portion 134. Other non-limiting example shapes for cavities 115 are shown in FIGS. 12A through 12D.

In one embodiment the unfoamed polymeric material portions 130 may be sized such that, while the overall volume of each unfoamed polymeric material portions 130 is smaller than the volume of the equivalent second mold cavity 250, at least one dimension of the unfoamed polymeric material portions 130 may be greater than an equivalent dimension of the second mold cavity 250. For example, the embodiment of FIG. 6E shows unfoamed polymeric material portions 130 that have a length greater than the length of the second mold cavity 250 into which it is placed. As a result, when the second mold 245 is closed the unfoamed polymeric material portions 130, while still having a volume less than that of the second mold cavities 250, are packed into the second mold cavities 250 under pressure as the distal ends of the unfoamed polymeric material portions 130 are forced against the bottom walls of the second mold cavities 250. This may be beneficial, in some embodiments, in ensuring that the unfoamed polymeric material 130 foams and expands in the manner and direction necessary to produce finished parts having the required shape, volume, and density.

Figure 6A:
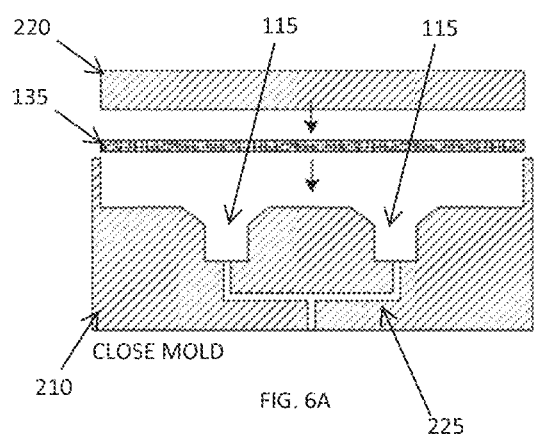
FIGS. 6A to 6G are schematic views of another method of molding a plurality of polymeric material elements to a fabric, in accordance with one embodiment of the invention.
Figure 6B:
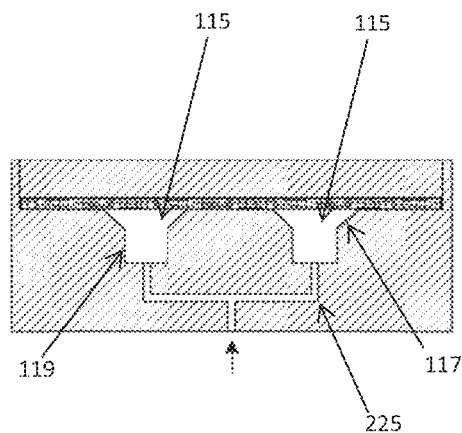
Figure 6C:
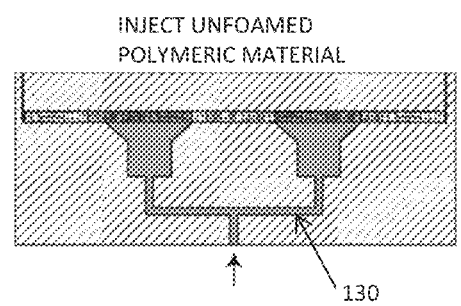
Figure 6D:
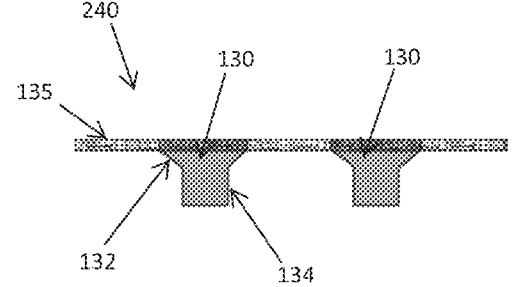
Figure 6E:
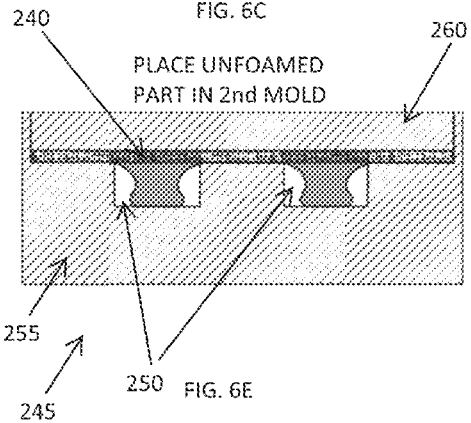
Figure 6F:
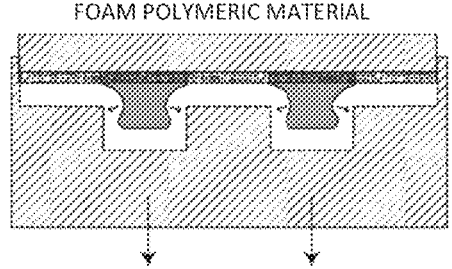
Figure 6G:
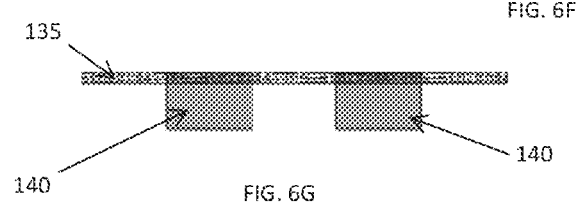

The method of FIGS. 6A to 6G may be beneficial, for example, in embodiments where the fabric 135 restricts (or substantially prevents) expansion of the unfoamed polymeric material portion 130 embedded within the fabric 135 during foaming. By having the cross-sectional area of the unfoamed polymeric material portion 130 above the fabric taper to a smaller diameter than that of the unfoamed polymeric material portion 130 within the fabric 135, expansion of the material during foaming can be controlled to ensure that the cross-sectional area of the foamed material 140 within the fabric and above the fabric 135 meets the required design parameters. For example, the sloped side wall section 117 and a vertical side wall section 119 of FIG. 6B are configured such that the finished part have foamed elongate elements 140 with a constant cross-sectional area in both the fabric 135 embedded portion and the elongate portion extending therefrom (as shown in FIG. 6G). In various alternative embodiments the unfoamed polymeric material portion 130 may be shaped to produce finished foamed elongate elements 140 having any appropriate linear or curved tapering (inwards or outwards) and/or any other appropriate variation in cross-section along its length, or a portion thereof.

In the embodiment of FIGS. 6A-6G the unfoamed polymeric material 130 is foamed by "cracking" or otherwise depressurizing the second mold cavities 250, as shown in FIG. 6F. In alternative embodiments any appropriate means of foaming the unfoamed polymeric material 130 may be utilized.

Figure 7A:
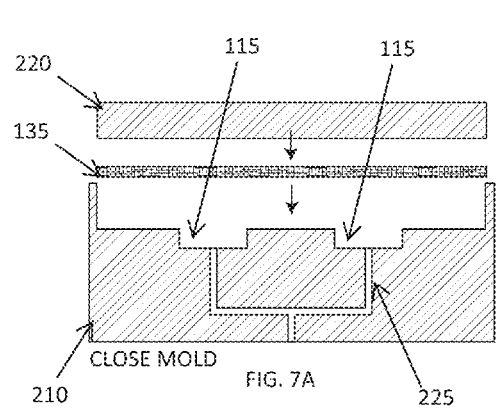
FIGS. 7A to 7H are schematic views of another method of molding a plurality of polymeric material elements to a fabric, in accordance with one embodiment of the invention.
Figure 7B:
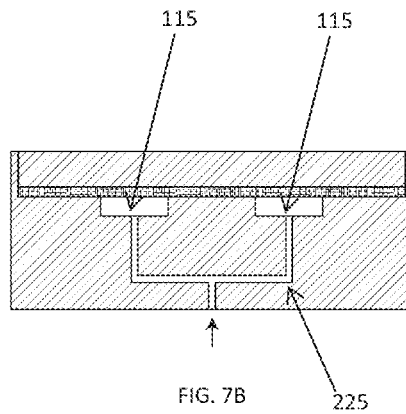
Figure 7C:
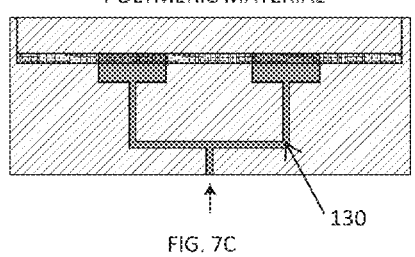
Figure 7D:
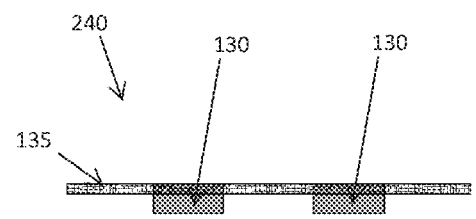
Figure 7E:
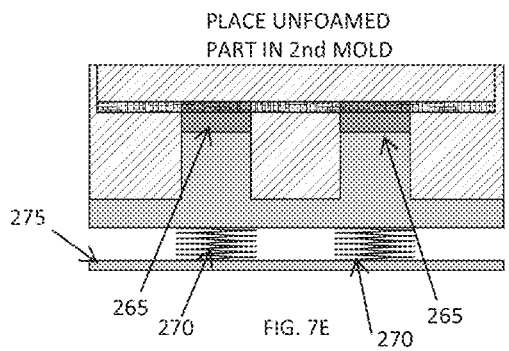
Figure 7F:
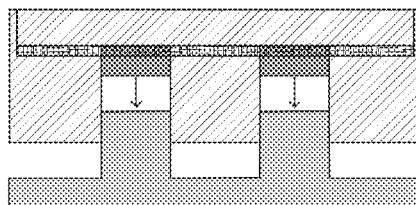
Figure 7G:
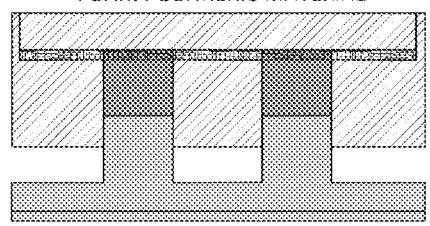
Figure 7H:
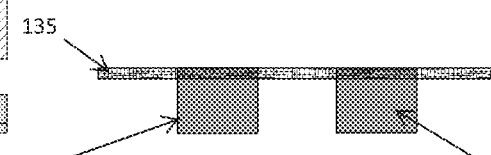

In a further embodiment, a second mold 245 can include cavities 250 having one or more expandable wall 265, wherein the expandable wall(s) 265 allow the foaming of the unfoamed polymeric material 130 to be controlled and guided to ensure that the foamed elongate elements 140 conform to the required shape and volume, as shown in FIGS. 7A to 7H. In this embodiment, the expandable wall 265 can be locked in place until the blowing agent is in condition to activate and foaming is desired, at which time it can be unlocked (either manually or automatically), thereby allowing the pressure in the cavities 250 to be released and the foaming and expansion of the polymeric material within the cavities 250 to occur, as shown in FIGS. 7F and 7G.

In one embodiment the retraction of the expandable wall 265 can be controlled by spring elements 270 mounted to a base 275, as shown in FIG. 7E. In an alternative embodiment retraction of the expandable wall 265, or walls, can be controlled by any appropriate mechanical, electromagnetic, pneumatic, hydraulic, or other retraction mechanism. In one embodiment the expandable wall 265 doesn't lock in place, but rather is preferentially biased towards the cavities 250 by the one or more spring elements 270 such that foaming and expansion of the polymeric material is initiated automatically upon the blowing agent being activated (e.g., when the temperature of the cavities 250 reaches or exceeds the activation temperature of the blowing agent).

In one embodiment fluid injection channels can be located to inject polymeric material into any one or more locations of a mold cavity, and can be positioned to inject polymeric material into a portion of a cavity away from the fabric, or into a portion of the cavity proximate the fabric. In one embodiment, as shown in FIG. 8A, fluid injection channels 225 can be arranged to inject polymeric material through the fabric 135 and into the mold cavities 250. In an alternative embodiment the fluid injection channels 225 can include elongate extension 280 (e.g., needles) extending therefrom to penetrate through the fabric 135 and into the cavities 250.

In one embodiment, as shown in FIGS. 9A to 9E, a single mold 305 can be used for both the injection molding of unfoamed polymeric material 130 to a fabric 135 and the foaming of the polymeric material after injection molding. In this embodiment the mold 305 includes a first mold portion 310 and a second mold portion 320 with a plurality of cavities 115 located in the first mold portion 310. The first mold portion 310 further includes one or more expandable wall 265 that can be expanded manually or through an automated mechanism, as shown in FIG. 9C. In operation, the unfoamed polymeric material 130 can be injected into the cavities 115 through one or more fluid injection channels 225 when the expandable wall 265 is positioned to limit the volume of the cavities 115 to a first volume, as shown in FIGS. 9A and 9B. This may occur, for example, with the cavities 115 heated to a first temperature below the activation temperature of the blowing agent within the polymeric material.

Once the unfoamed polymeric material 130 has been injected into the cavities 115 to attach to the fabric 135 the cavities 115 can be heated to a second temperature at or above the activation temperature of the blowing agent. Prior to the activation temperature being reached the expandable wall 265, or walls, can be retracted to increase the volume of the cavities 115 to define the volume and shape required of the finished part. As such, once the blowing agent is activated the polymeric material foams and expands to produce the finished part having a plurality of separate foamed elongate elements 140 extending from a sheet of fabric 135.

In an alternative embodiment the entire first mold portion 310 can be retracted after injection of the unfoamed polymeric material 130 and heating of the polymeric material to a temperature at or above the activation temperature of the blowing agent. In this embodiment, as shown in FIGS. 10A to 10E, the retraction of the first mold portion 310, and therefore the retraction of the cavities 115 restraining the polymeric material, allows the material to foam and expand in three-dimensions to form a finished foamed part.

Figure 11A:
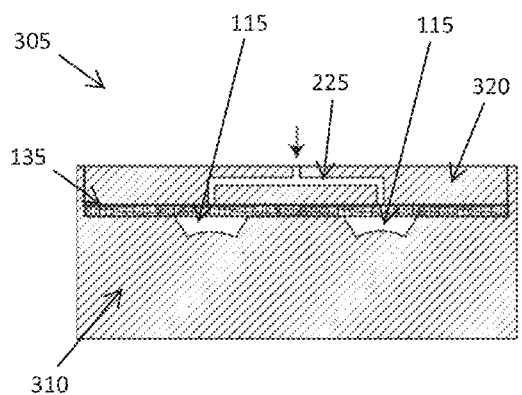
FIGS. 11A to 11E are schematic views of another method of molding a plurality of polymeric material elements to a fabric, in accordance with one embodiment of the invention.
Figure 11B:
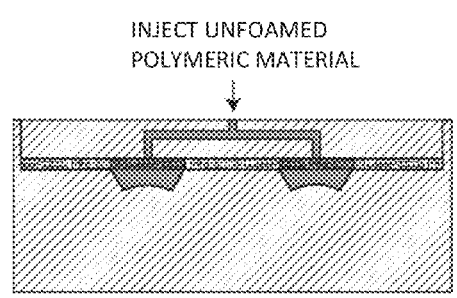
Figure 11C:
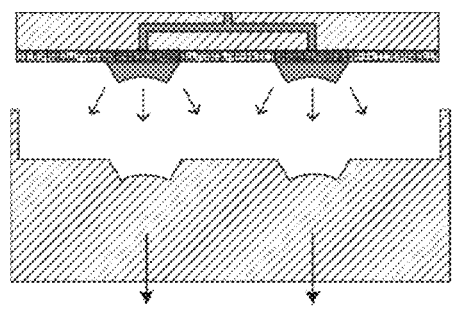
Figure 11D:
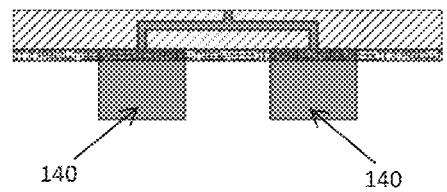
Figure 11E:
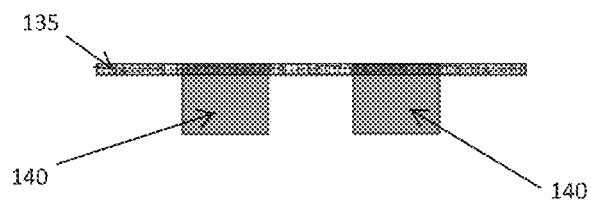

FIGS. 11A to 11E show a similar process with the cavities 115 tapered to produce unfoamed polymeric material 130 portions having a tapered profile extending from the fabric 135, with the tapering shaped to ensure that the finished foamed elongate elements 140 have the required cross-sectional profile (e.g., the constant cross-sectional profile of FIG. 11E.)

Figure 12A:
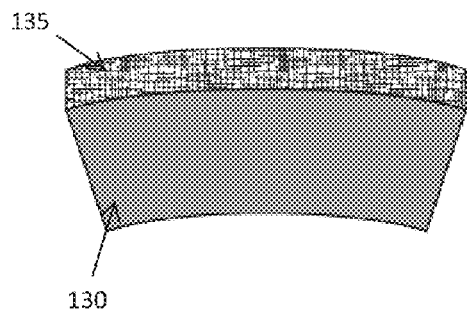
FIGS. 12A to 12D are schematic views of example mold shapes for molding unfoamed polymeric material to fabric, in accordance with various embodiments of the invention.
Figure 12B:
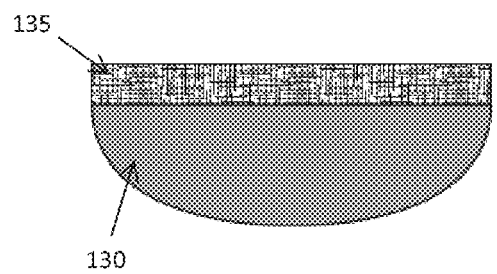
Figure 12C:
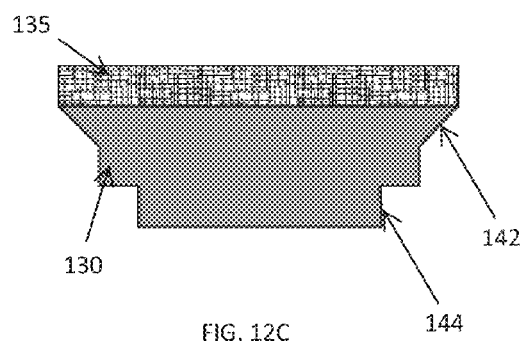
Figure 12D:
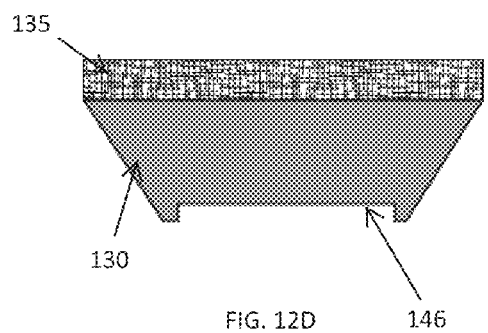
Figure 13A:
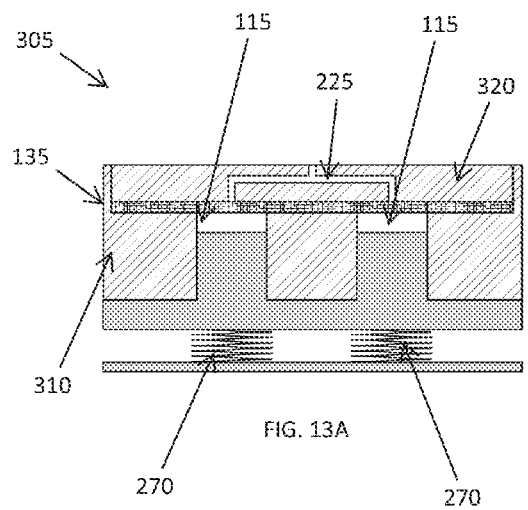
FIGS. 13A to 13E are schematic views of another method of molding a plurality of polymeric material elements to a fabric, in accordance with one embodiment of the invention.
Figure 13B:
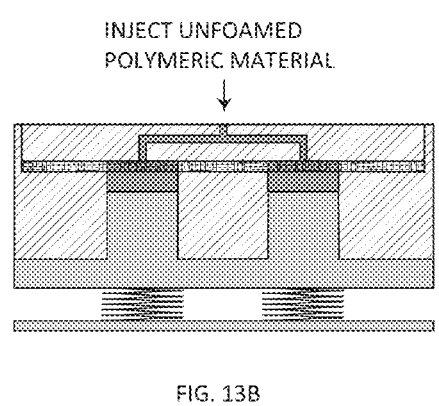
Figure 13C:
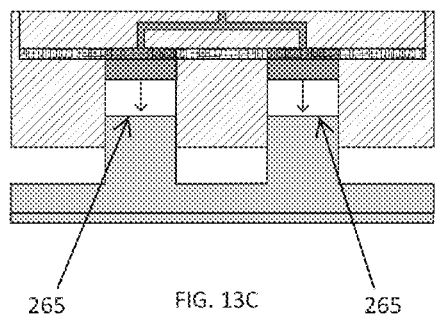
Figure 13D:
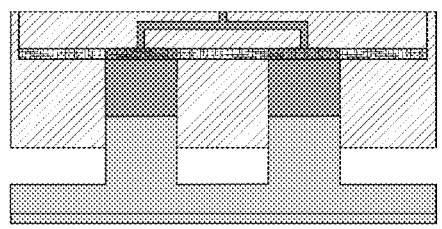
Figure 13E:
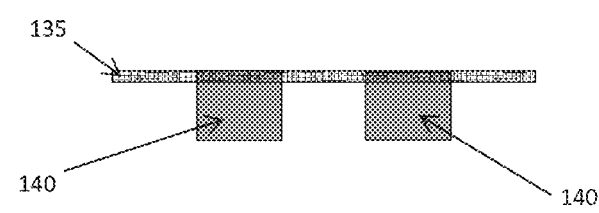
Figure 14A:
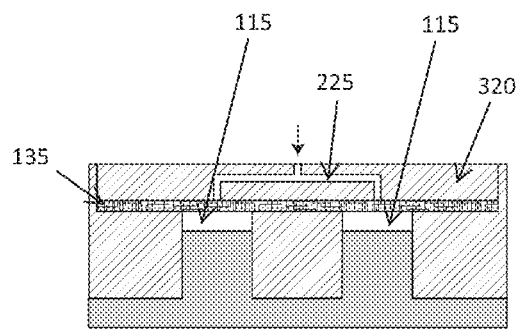
FIGS. 14A to 14D are schematic views of another method of molding a plurality of polymeric material elements to a fabric, in accordance with one embodiment of the invention.
Figure 14B:
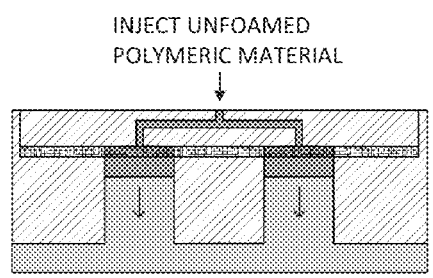
Figure 14C:
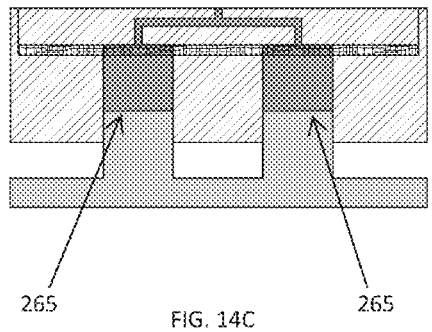
Figure 14D:
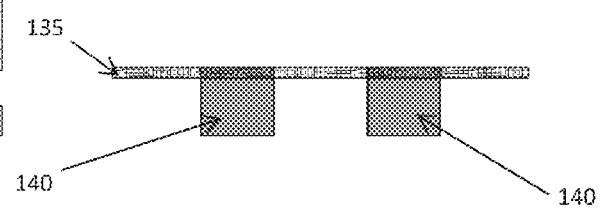
Figure 15A:
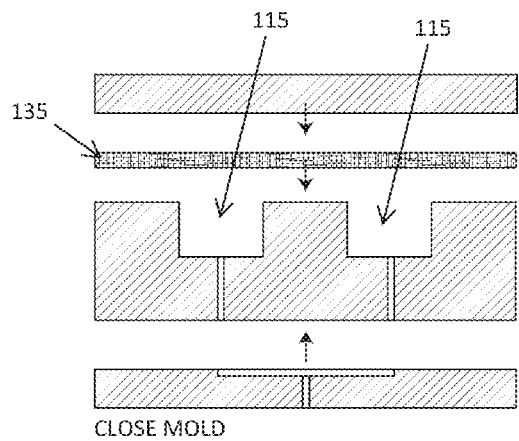
FIGS. 15A to 15D are schematic views of another method of molding a plurality of polymeric material elements to a fabric, in accordance with one embodiment of the invention.
Figure 15B:
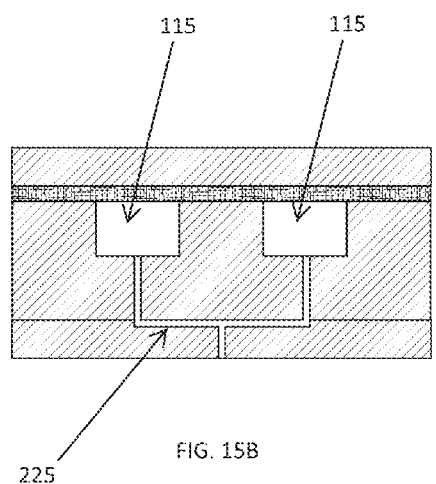
Figure 15C:
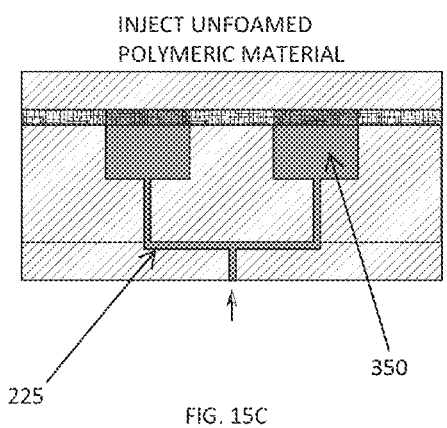
Figure 15D:
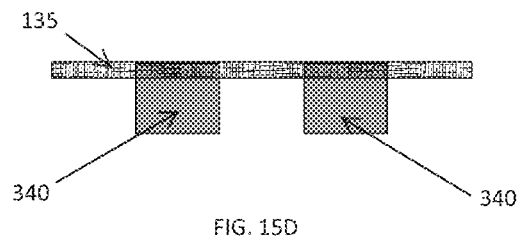

Various shapes of fabric 135 and unfoamed material 130 are shown in FIGS. 12A to 12D, the shapes produced within the mold cavities 115 in accordance with any of the methods and systems described herein. FIG. 12A, for example shows an unfoamed material portion 130 and fabric portion 135 wherein both the fabric 135 and unfoamed material 130 have a concave form, with this concave structure adapted to straighten out to form a substantially flat surface at the upper and lower ends thereof upon foaming. In various embodiments the fabric portion 135 may be flat or have any appropriate curvature or other structure, while the unfoamed material 130 can extend from the fabric 135 at any appropriate constant or varying angle. FIG. 12B shows an unfoamed material portion 130 extending from a fabric portion 135 as a curved extension. In various embodiments any appropriate constant or varying curvature may be utilized in the elongate extension, or a portion thereof. FIG. 12C shows an unfoamed material portion 130 extending from a fabric portion 135 with a tapered section 142 and a stepped section 144. In alternative embodiments any number and/or combination of tapered, stepped, and/or curved elements may be utilized. FIG. 12D shows a tapered unfoamed material portion 130 extending from a fabric portion 135 with a cavity 146 at a distal end thereof. The positioning of one or more cavities at the distal end may be helpful, in certain embodiments, in producing foamed parts having curved or otherwise shaped distal portions. The cavity, or cavities, may be of any appropriate size and shape.

In a further alternative embodiment the expandable wall 265 can be spring-loaded by one or more spring elements 270, or otherwise preferentially biased in first position to allow the expandable wall 265 to retract automatically during expansion, as shown in FIGS. 13A to 13E. In this embodiment the expansion of the material during foaming can be controlled to ensure that the finished part meets the required geometry and density parameters.

One embodiment of the invention includes injecting a volume of a mixture of polymeric material and blowing agent through one or more fluid injection channels 225 and into an expandable mold cavity having a fabric 135 therein and expanding the mold cavity to form the foamed part. In this embodiment, as shown in FIGS. 14A to 14D, unfoamed polymeric material 130 with a blowing agent (e.g., a supercritical fluid blowing agent) dissolved therein is injected into the mold cavities 115 through fluid injection channels 225 at an elevated temperature and pressure. Upon exiting the fluid injection channels 225 and entering the cavities 115 the blowing agent comes out of solution and the polymeric material foams and expands. In various embodiments the expandable wall 265 can be retracted as soon as the polymeric material is injected into the cavities 115, or be held in an unexpanded position for a first time period prior to retraction. In addition, the rate at which the expandable wall 265 is retracted can be controlled to assist in controlling the expansion of the polymeric material into the final, foamed, geometry.

An example injection molding system for use in mixing polymeric material and blowing agent, injecting the unfoamed polymeric material and blowing agent into a mold cavity, and retracting the mold cavity to form a finish part is described in U.S. Patent Publication No. 2012-0196115 (U.S. patent application Ser. No. 13/360,229) the disclosure of which is incorporated herein by reference in its entirety.

One embodiment of the invention, as shown in FIGS. 15A to 15D, includes the molding of a finished part having a plurality of separate unfoamed elongate elements 340 extending from a sheet of fabric 135. In this embodiment polymeric material 350 without blowing agent dissolved therein can be injected through one or more fluid injection channels 225 into a cavity 115 having a portion of fabric 135 held therein. The polymeric material 350 attaches to the fabric to produce the finished part without the need for foaming of the material after attachment/interdigitation with the fabric 135. This method may be advantageous, for example, in producing parts having a higher density to produce more durable and longer wearing parts.

Figure 16A:
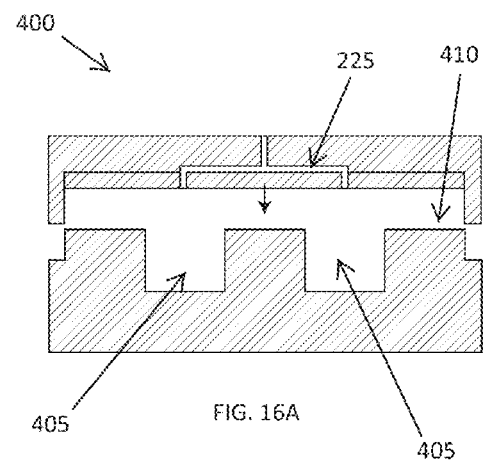
FIGS. 16A to 16G are schematic views of a method of bonding a plurality of polymeric material elements to a fabric, in accordance with one embodiment of the invention.
Figure 16B:
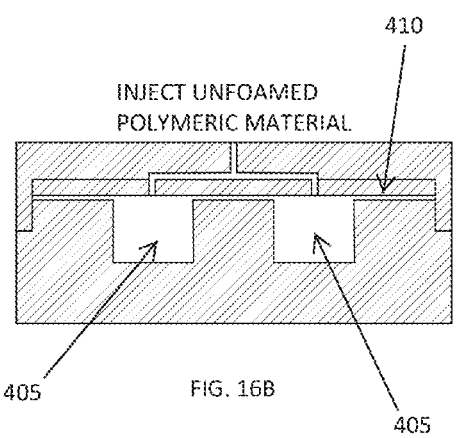
Figure 16C:
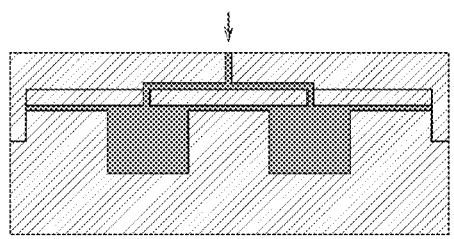

Another embodiment of the invention includes a method of attaching a plurality of foamed elongate extensions to a fabric by forming the elongate extensions in a sheet of foamed material, gluing or otherwise bonding the distal ends of the extensions to a sheet of fabric, and thereafter removing the portion of the foamed sheet joining the elongate extensions. An example of such a method is shown in FIGS. 16A to 16G. In this embodiment a mold 400 includes a plurality of elongate cavities 405 connected by at least one base cavity 410, with at least one material injection channel 225 in fluid communication with the base cavity 410 proximate the elongate cavities 405, as shown in FIG. 16A. In an alternative embodiment the material injection channels 225 can connect to any portion of the base cavity 410 and/or elongate cavities 405.

Figure 16D:
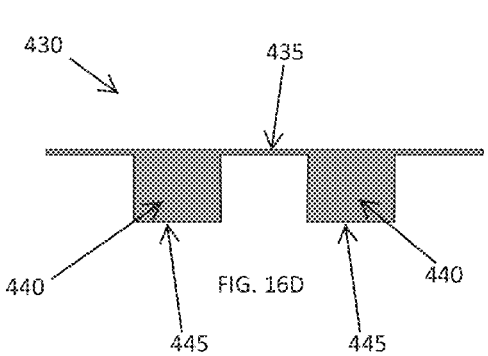
Figure 16E:
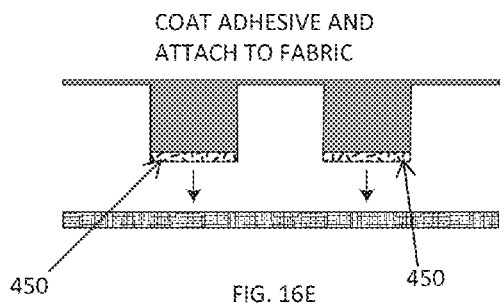
Figure 16F:
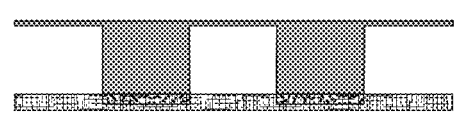
Figure 16G:
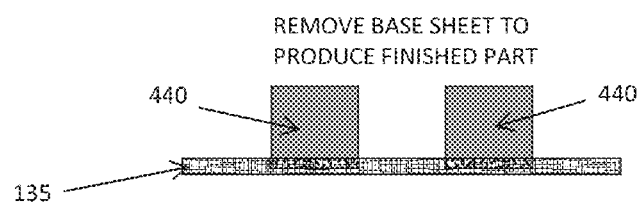

In operation, unfoamed polymeric material 130 is injected through the material injection channel 225 to fill the base cavity 410 and the plurality of elongate cavities 405. The unfoamed material can thereafter be foamed through any of the foaming methods described herein. Foaming the polymeric material produces a foamed part 430 including a base sheet 435 with a plurality of elongate extensions 440 projecting therefrom, as shown in FIG. 16D. This part can be removed from the mold 400, after which an adhesive 450, or other appropriate bonding material, is applied to the distal ends 445 of the elongate extensions 440. The distal ends 445 of the elongate extensions 440 are then pressed against the fabric 135, either manually of through an appropriate automated pressing mechanism, to fixedly bond the elongate extensions 440 to the fabric 135. Once the adhesive 450 is set the base sheet 435 can be removed, thereby leaving the separated elongate extensions 440 bonded to the at least one fabric 135.

The base sheet 435 can be separated from the elongate extensions 440 by cutting or by simply pulling from the elongate extensions 440. In one embodiment the base sheet 435 is molded with perforations at the joins between the base sheet 435 and the elongate extensions 440 to ease separation and removal.

In one embodiment the foamed part 430 shown in FIG. 16D, with a base sheet 435 having a plurality of elongate extensions 440 projecting therefrom, can be cemented, stitched, or otherwise attached directly to an upper of a shoe (by bonding the base sheet 435 to the upper with the elongate extensions 440 extending therebelow) to form a sole therefor, without the need to attach the elongate extensions 440 to a fabric layer and remove the base sheet 435.

In an alternative embodiment the base sheet 435 may be formed as a plurality of distinct elongate joining elements (e.g., thin threads of material joining the plurality of elongate extensions 440 together). These elongate joining elements may be removed by cutting or by pulling away from the elongate extensions 440, or may simply break and fall away, for example, through twisting or otherwise manipulating the fabric 135.

In one embodiment both a first mold portion and a second mold portion may have cavities formed therein. These cavities can be located directly opposite each other or arranged in a non-matching configuration. Having cavities in both mold portions, with the fabric positioned between, allows for the molding of a part having elongate foamed or unfoamed extensions extending from both sides of the fabric.

In one embodiment a mold cavity with fabric positionable on more than one side of the cavity (e.g., on a top and a bottom of the cavity) can be utilized, thereby allowing for the manufacture of a finished part having one or a plurality of elongate elements extending between and attached to two or more separate fabric portions.

Figure 17A:
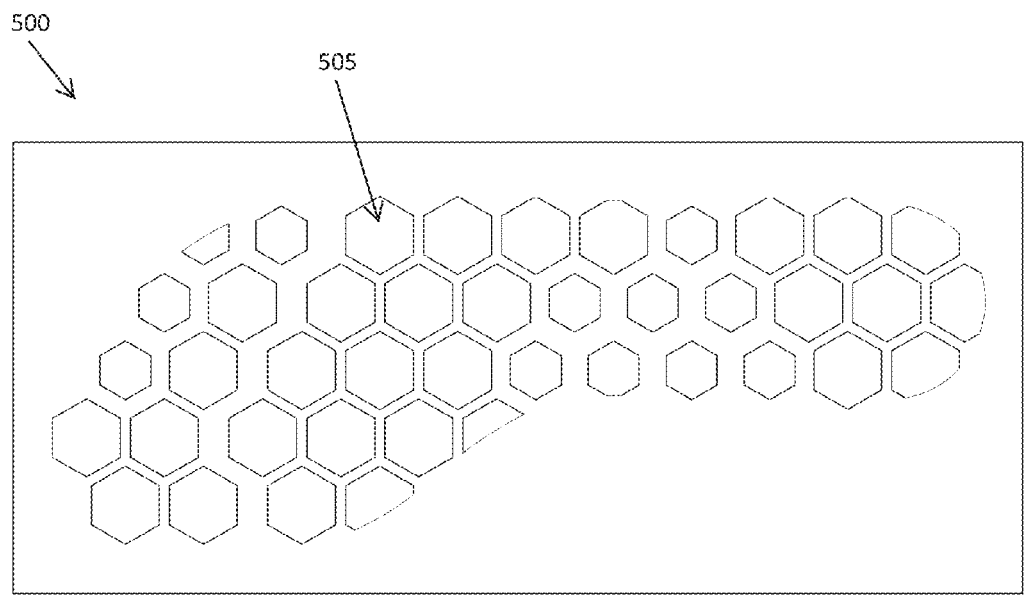
FIG. 17A is a schematic plan view of a mold portion for forming a sole of article of footwear, in accordance with one embodiment of the invention.
Figure 17B:
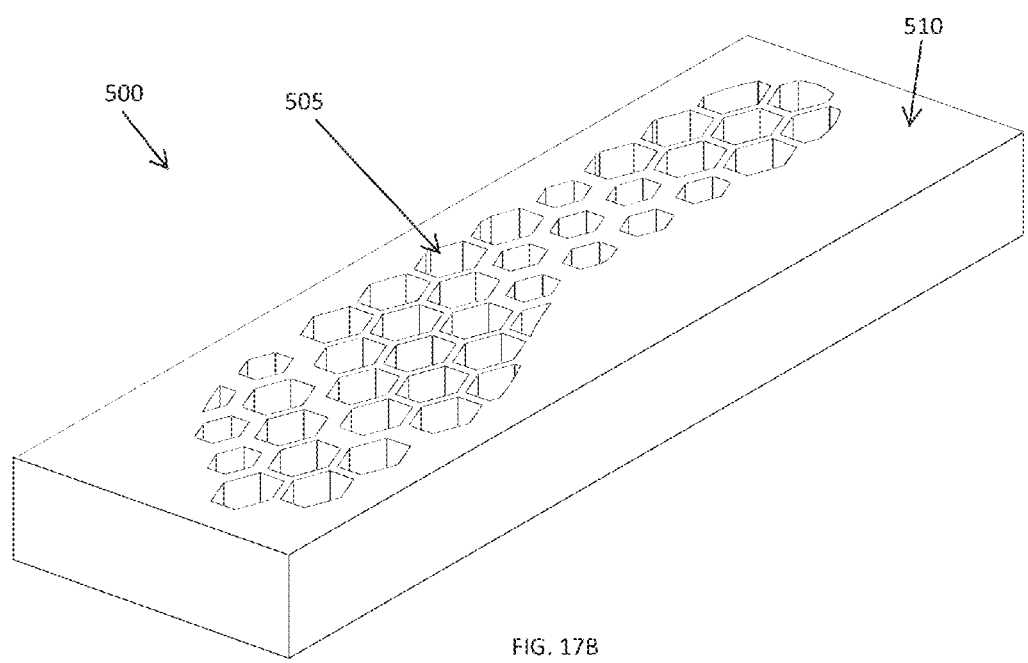
FIG. 17B is a schematic perspective view of the mold portion of FIG. 17A.

An example mold portion 500 for use in the methods described hereinabove is shown in FIGS. 17A and 17B. In this embodiment, the mold portion 500 includes a plurality of separate cavities 505 arranged in the shape of a sole of an article of footwear. The cavities 505 each have a hexagonal cross-section, or a portion thereof, and have one of a number of cross-sectional diameters. In an alternative embodiment the cavities 505 can all have the same cross-sectional diameter. In the embodiment of FIGS. 17A and 17B each cavity 505 has the same depth, with the depth of the cavity defining the depth of the resulting elongate extensions. In an alternative embodiment the cavities 505 can be of varying depth with, for example, shallower cavities around one or more edges of the shape formed by the plurality of cavities 505 (in this case a shoe sole). For example, one embodiment may have shallower cavities at the front/toe portion of the shoe sole and/or the rear/heel portion of the shoe sole, with deeper cavities in the mid-foot region. In another embodiment the cavity depths may be arranged to produce sole elements with thinner forefoot regions and thicker heel regions, thereby producing a sole with a drop of any required distance from heel to forefoot.

The mold portion 500, and other mold portions making up the mold, may be manufactured from any appropriate material such as, but not limited to, a metal (e.g., aluminum), a clay, a 3-D printed material, or any other material having appropriate thermal and structural characteristics to be used for molding purposes.

The cavities 505 may be spaced apart by any appropriate distance, depending upon the specific desired characteristics of the shoe sole formed from the elongate elements and fabric. For example, the cavities 505 can be placed sufficiently far apart to ensure that the elongate elements formed by the cavities are spaced apart on the fabric to provide a shoe sole with a high degree of flexibility (i.e., with the elongate elements spaced apart so that during the full motion of a standard running gait the elongate elements, or pods, remain separated and free to interact separately with any ground surface that they come into contact with. Alternatively, at least some of the elongate elements, or pods, may be spaced closely together such that the abut during a ground contact phase of a running gait to provide additional stability to the shoe sole during ground contact while being separate, and therefore providing a high level of flexibility, during the non-round contact portion of a running gait. In one embodiment the side walls of one or more elongate elements may be shaped to interact with the side wall of an adjoining elongate element, for example to allow for variations in flexibility in different directions (e.g., by allowing for greater flexibility in a longitudinal direction and lesser flexibility in a transverse direction and/or allowing differing levels of flexibility in different regions or the finished part).

In one embodiment the upper surface 510 of the mold portion 500 (i.e., the surface into which the cavities 505 extend may be planar, or substantially planar. In an alternative embodiment the upper surface 510 of the mold portion 500 may be curved or otherwise angled to produce a foam and fabric part having a complex surface profile.

Figure 18:
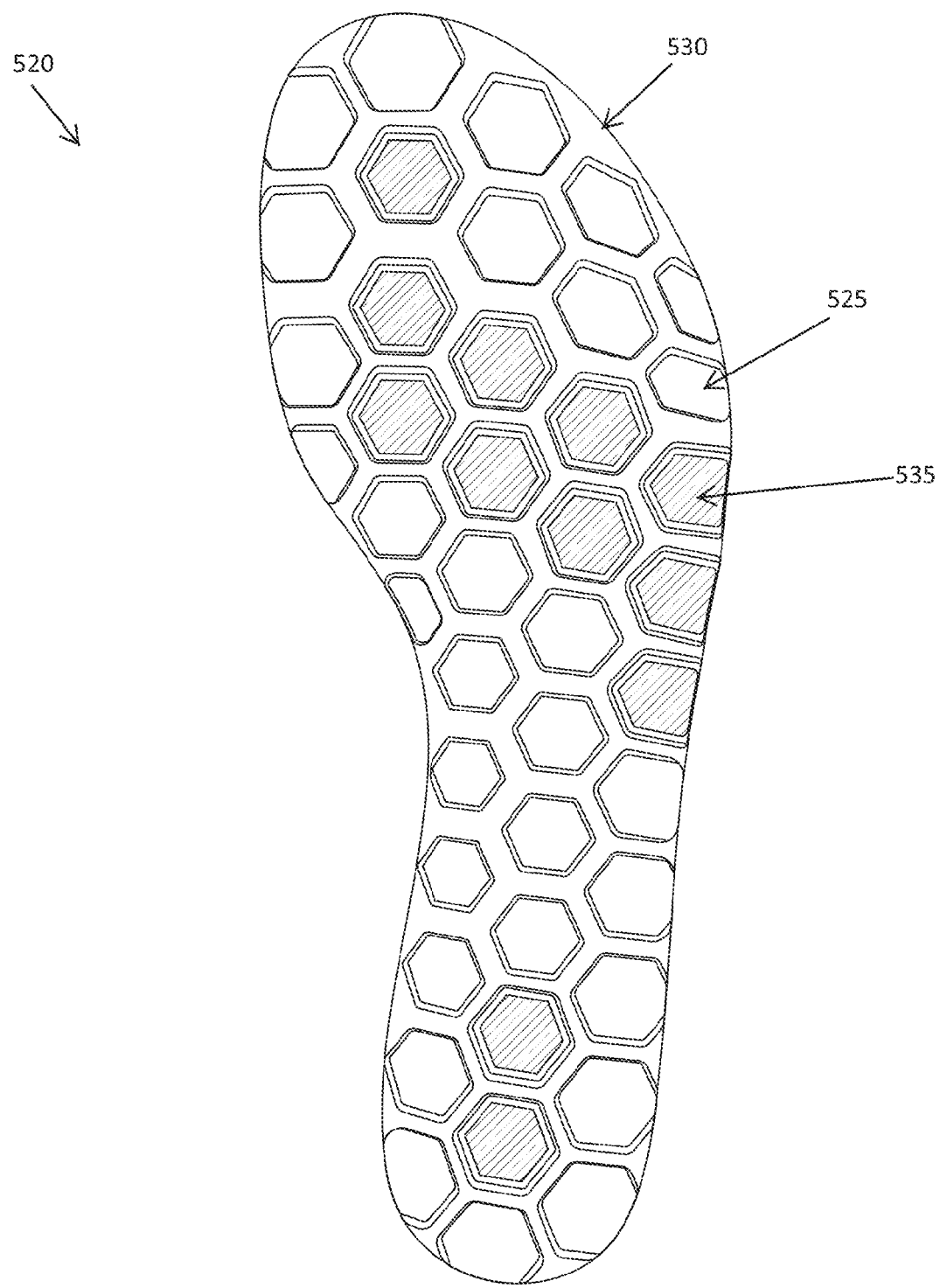
FIG. 18 is a bottom view of a sole of an article of footwear, in accordance with one embodiment of the invention.

An example sole 520 for an article of footwear manufactured from the methods described herein is shown in FIG. 18. The sole includes a plurality of elongate elements, or pods 525 extending from a base layer of fabric 530. In this embodiment a number of the pods 525 have ground contact pads 535 attached to the distal end, or bottom, of the pods 525. These ground contact pads 535 can be formed from rubber, ground contact EVA, or any other appropriate material. The ground contact pads 535 can be adhered to the pods 525 after molding of the pods 525 to the fabric 530. Alternatively, the pads 535 could be placed within the distal end of a number of cavities prior to the molding of the foamed pods 525 to the fabric, with the pads 535 thereafter being integrally molded with the foamed material during the molding process.

Figure 19A:
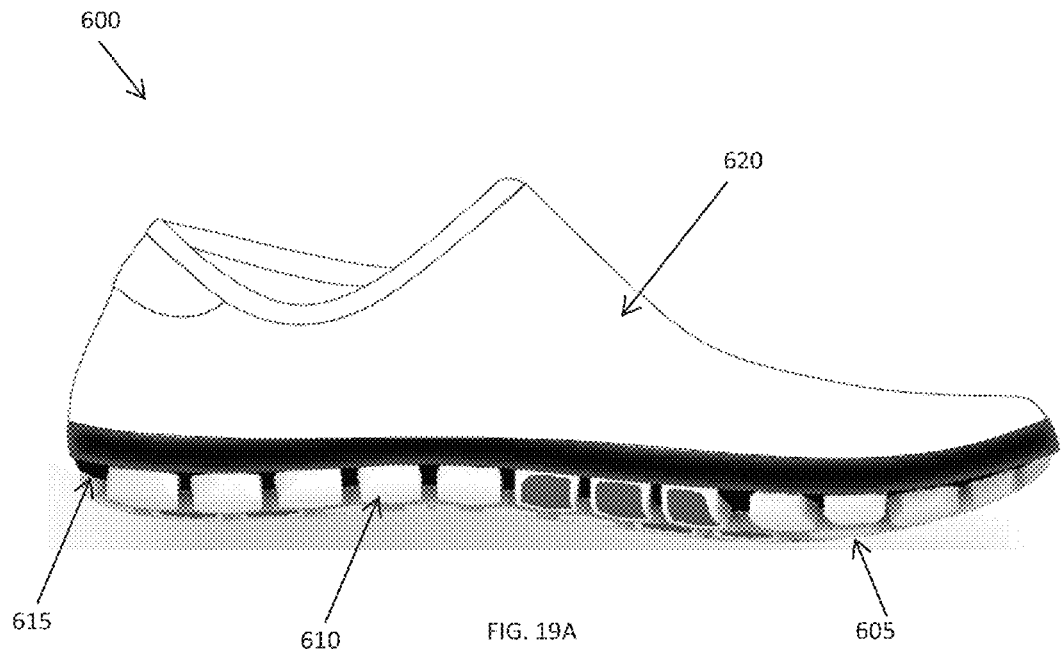
FIG. 19A is a side view of an article of footwear, in accordance with one embodiment of the invention.
Figure 19B:
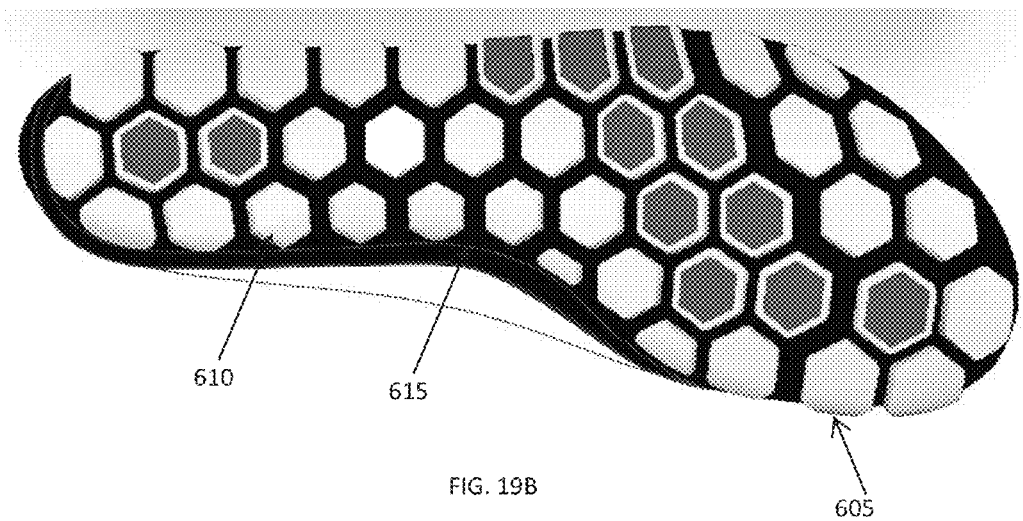
FIG. 19B is a bottom view of the article of footwear of FIG. 19A.

An example article of footwear 600 having a sole 605 including a plurality of pods 610 attached to a fabric layer 615 is shown in FIGS. 19A and 19B. The fabric 615 can be attached to the upper 620 through any appropriate means such as, but not limited to, stitching, cementing or otherwise adhering, and/or taping. In an alternative embodiment the fabric onto which the pods 610 are attached is a sole portion of a sock-like foot covering, thereby allowing the fabric and pods 615 to form an entire article of footwear without the need for additional elements of a sole or upper being required.

Figure 20A:
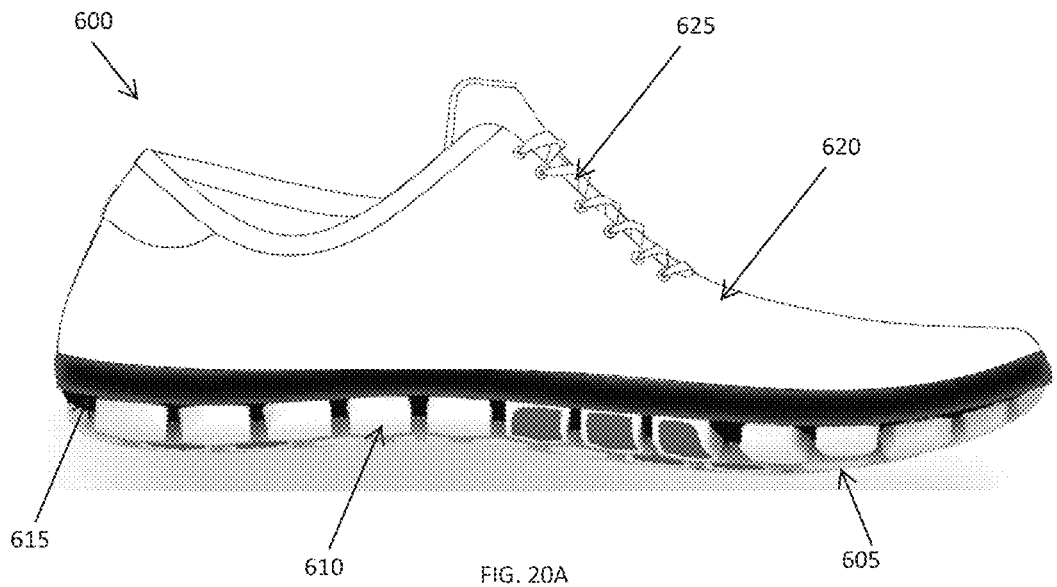
FIG. 20A is a side view of another article of footwear, in accordance with one embodiment of the invention.
Figure 20B:
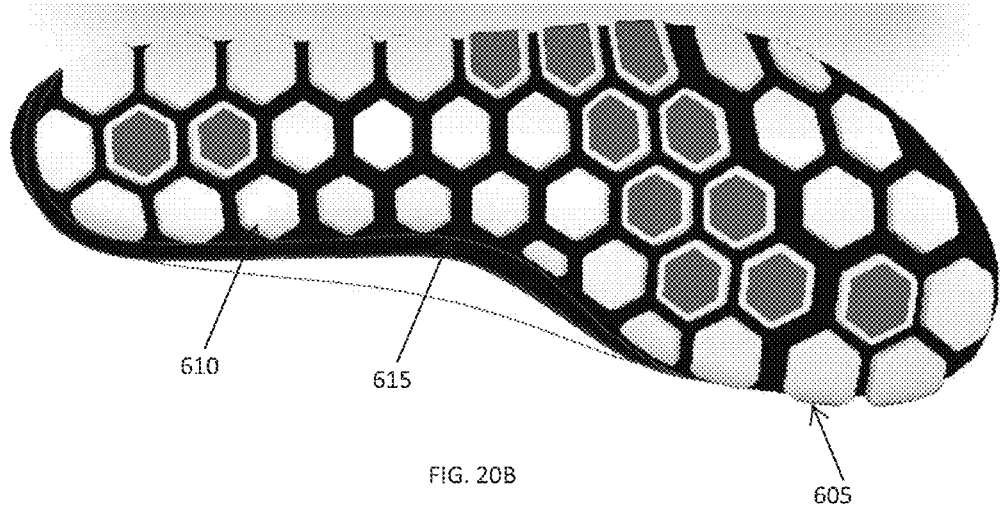
FIG. 20B is a bottom view of the article of footwear of FIG. 20A.

In the embodiment of FIGS. 19A and 19B the upper 620 of the article of footwear 600, or a portion thereof, includes a certain degree of stretch to allow the upper to form fit to a foot of a wearer without the need for a lacing system or other fastening system to releasably hold the article of footwear 600 on the foot. In an alternative embodiment a lacing system, hook-and-loop fastening system, or other appropriate fastening system can be used to hold the article of footwear 600 on the foot. An article of footwear 600 having lacing system 625 is shown in FIGS. 20A and 20B.

Figure 21A:
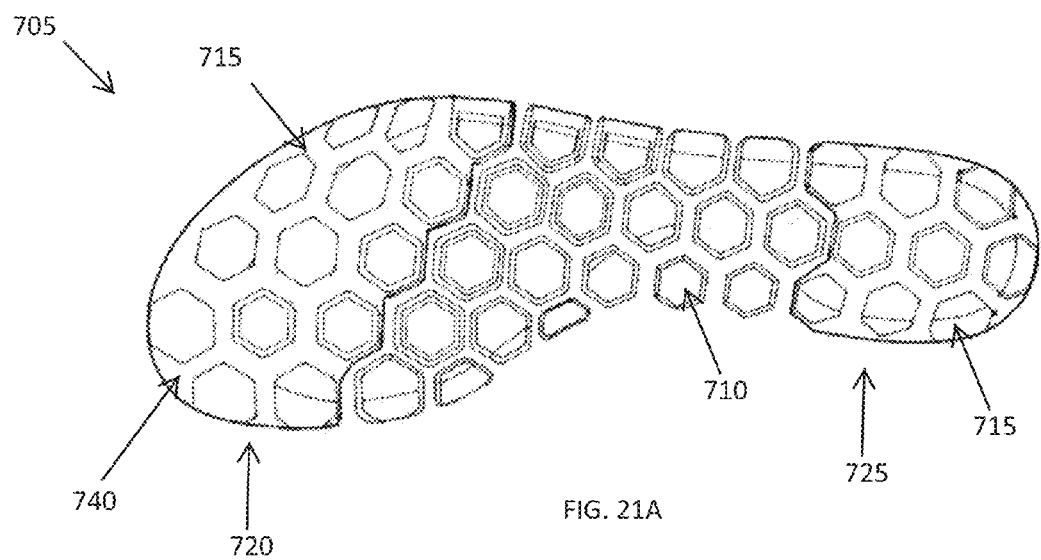
FIG. 21A is a schematic plan view of sole elements for another article of footwear, in accordance with one embodiment of the invention.
Figure 21B:
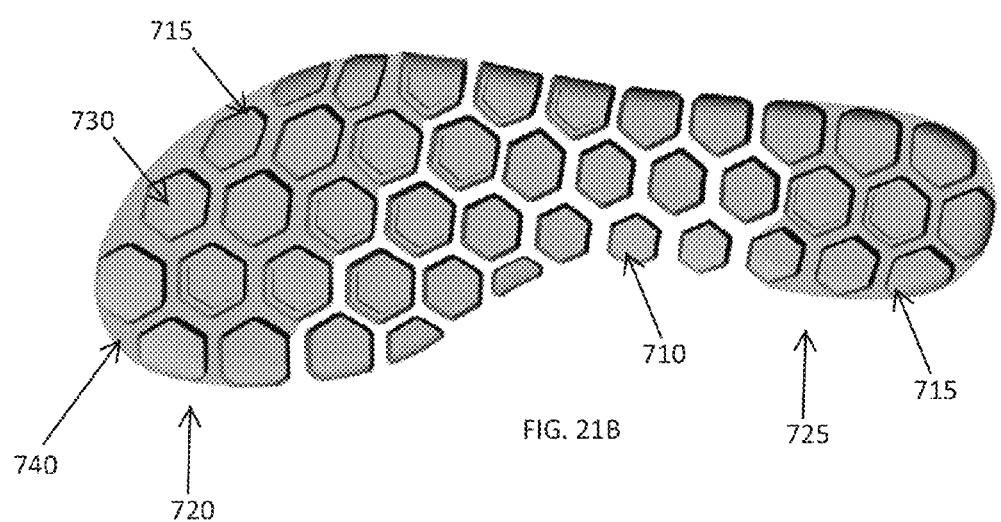
FIG. 21B is another plan view of the sole elements of FIG. 21A.
Figure 21C:
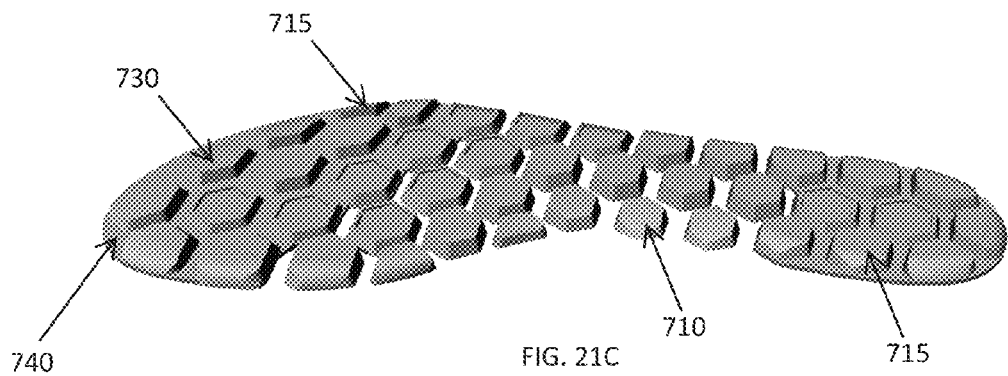
FIG. 21C is a perspective view of the sole elements of FIG. 21A.

FIGS. 21A to 21C shows an arrangement of foamed pods 705 for another example sole for an article of footwear (e.g., an athletic shoe). In this embodiment, the foamed pods 705 include a plurality of separate pod elements 710 with an arrangement of connected pod elements 715 located at a forefoot region 720 and a heel region 725. The connected pod elements 715 includes a plurality of foamed elongate elements 730 connected by a base portion 740 which can be integrally formed with the foamed elongate elements 730 according to any of the methods described herein. In various embodiments any appropriate arrangement and position of the connected pod elements 715 and/or separate pod elements 710 may be utilized, depending upon the specific performance requirements of the shoe.

One embodiment of the invention can include a shoe with a sole having a first portion formed from a fabric/pod construction with a second portion formed separately from any other molding method. For example, a shoe may include a sole formed from a traditional injection molding or compression molding process with one or more cavities in a forefoot and/or midfoot into which a fabric/pod sole portion can be positioned. Such a construction would allow for a sole having a more traditional feel and function but with a region of high flexibility and feel provided by the fabric/pod insert.

It should be understood that alternative embodiments, and/or materials used in the construction of embodiments, or alternative embodiments, are applicable to all other embodiments described herein. The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A method of attaching foamed polymeric material to at least one fabric layer, the method comprising:
   providing a first mold comprising at least one first cavity having at least one tapered section and at least one material injection channel in fluid communication with the at least one first cavity;
   disposing at least one fabric layer over the at least one first cavity;

closing the first mold;

injecting unfoamed polymeric material into the at least one first cavity through the at least one material injection channel, wherein the unfoamed polymeric material penetrates at least a portion of the fabric layer proximate the at least one first cavity to attach the polymeric material to the fabric layer, and wherein the unfoamed polymeric material comprises an elongate extension extending from the fabric layer and comprising at least one tapered portion formed by the tapered section and having a cross-sectional area; and foaming the unfoamed polymeric material to fixedly set the foamed polymeric material in the at least one fabric layer, where expansion during foaming of the polymeric material that has penetrated the fabric layer is restricted by the fabric, and wherein expansion during foaming of the polymeric material in the elongate extension modifies the cross-sectional area of the tapered portion.

2. The method of claim 1, wherein the mold comprises a plurality of cavities.

3. The method of claim 2, wherein the plurality of cavities is arranged such that the foamed polymeric material and fabric form at least a portion of a sole of an article of footwear.

4. The method of claim 1, wherein the polymeric material comprises a material selected from the group consisting of polymers, elastomers, and thermoplastics.

5. The method of claim 1, wherein the polymeric material comprises at least one of ethylene vinyl acetate (EVA), EVA copolymers, polyethylene (PE), chlorinated polyethylene (CPE), polyurethane (PU), thermoplastic polyurethane (TPU), DuPont™ Surlyn®, blown rubber, or thermoplastic rubbers (TPRs).

6. The method of claim 1, wherein the at least one fabric layer comprises at least one of a non-woven fabric layer, a woven fabric layer, and a knitted fabric layer.

7. The method of claim 1, wherein foaming the unfoamed polymeric material comprises:

removing the fabric and attached unfoamed polymeric material from the first mold;

providing a second mold comprising at least one second cavity, the at least one second cavity comprising a volume greater than that of the at least one first cavity;

placing the fabric layer and attached unfoamed material into the second mold such that the unfoamed polymeric material extends into the at least one second cavity;

closing the second mold; and foaming the unfoamed polymeric material within the at least one second cavity.

8. The method of claim 7, wherein the at least one second cavity comprises a volume of between about 1.1 to 6 times the volume of the at least one first cavity.

9. The method of claim 7, wherein the unfoamed polymeric material comprises at least one blowing agent, and wherein foaming the unfoamed polymeric material within the at least one second cavity comprises heating the at least one second cavity to a temperature of at least one of at and above a temperature at which the blowing agent activates.

10. The method of claim 9, wherein unfoamed polymeric material is injected into the at least one first cavity at a temperature below the temperature at which the blowing agent activates.

11. The method of claim 1, wherein foaming the unfoamed polymeric material comprises:

expanding the at least one first cavity after injecting the unfoamed polymeric material; and foaming the unfoamed polymeric material within the at least one expanded first cavity.

12. The method of claim 11, wherein the at least one first cavity is expanded to a volume of about 1.1 to 6 times its unexpanded volume.

13. The method of claim 11, wherein the unfoamed polymeric material comprises at least one blowing agent, and wherein foaming the unfoamed polymeric material within the expanded first cavity comprises heating the at least one expanded first cavity to a temperature of at least one of at and above a temperature at which the blowing agent activates.

14. The method of claim 13, wherein unfoamed polymeric material is injected into the at least one first cavity at a temperature below the temperature at which the blowing agent activates.

15. The method of claim 1, wherein the unfoamed polymeric material is injected into the at least one first cavity under pressure, and wherein foaming the unfoamed polymeric material comprises opening the first mold to release at least a portion of the pressure within the at least one first cavity.

16. The method of claim 15, wherein releasing at least a portion of the pressure comprises separating a first mold portion containing the at least one first cavity from a second mold portion such that the polymeric material is free to foam and expand without restriction by at least one wall of the at least one first cavity.

17. The method of claim 15, wherein releasing at least a portion of the pressure comprises opening the at least one first cavity to the surrounding atmosphere while retracting at least one wall of the at least one first cavity.

18. The method of claim 1, wherein foaming the unfoamed polymeric material comprises:

providing a mold comprising at least one cavity having at least one retractable wall; and expanding the at least one cavity to foam the unfoamed polymeric material by retracting the at least one retractable wall.

19. The method of claim 18, wherein the unfoamed polymeric material comprises at least one blowing agent adapted to come out of solution upon retracting the at least one retractable wall.

* * * * *